United States Patent
Valentine et al.

(10) Patent No.: US 11,526,354 B2
(45) Date of Patent: Dec. 13, 2022

(54) SYSTEMS, APPARATUSES, AND METHODS FOR FUSED MULTIPLY ADD

(71) Applicant: Intel Corporation, Santa Clara, CA (US)

(72) Inventors: Robert Valentine, Kiryat Tivon (IL); Galina Ryvchin, Haifa (IL); Piotr Majcher, Straszyn (PL); Mark J. Charney, Lexington, MA (US); Elmoustapha Ould-Ahmed-Vall, Chandler, AZ (US); Jesus Corbal, King City, OR (US); Milind B. Girkar, Sunnyvale, CA (US); Zeev Sperber, Zichron Yackov (IL); Simon Rubanovich, Haifa (IL); Amit Gradstein, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/487,628

(22) Filed: Sep. 28, 2021

(65) Prior Publication Data
US 2022/0012057 A1    Jan. 13, 2022

Related U.S. Application Data

(63) Continuation of application No. 16/338,324, filed as application No. PCT/US2016/057991 on Oct. 20, 2016, now Pat. No. 11,169,802.

(51) Int. Cl.
*G06F 9/30* (2018.01)
*G06F 7/544* (2006.01)
*G06F 9/38* (2018.01)

(52) U.S. Cl.
CPC ........ *G06F 9/30014* (2013.01); *G06F 7/5443* (2013.01); *G06F 9/30018* (2013.01);
(Continued)

(58) Field of Classification Search
None
See application file for complete search history.

(56) References Cited

U.S. PATENT DOCUMENTS 5,784,305 A * 7/1998 Nadehara .............. G06F 7/5338
708/523
5,862,067 A    1/1999 Mennemeier
(Continued)

FOREIGN PATENT DOCUMENTS

CN    101751244      5/2013
CN    104040484 A    9/2014
(Continued)

OTHER PUBLICATIONS

European Patent Office, Communication Pursuant to Article 94(3) dated May 6, 2022 in European Patent Application No. 16919077.4 (6 pages).
(Continued)

*Primary Examiner* — Michael Sun
(74) *Attorney, Agent, or Firm* — Trop, Pruner & Hu, P.C.

(57) ABSTRACT

Embodiments of systems, apparatuses, and methods for fused multiple add. In some embodiments, a decoder decodes a single instruction having an opcode, a destination field representing a destination operand, and fields for a first, second, and third packed data source operand, wherein packed data elements of the first and second packed data source operand are of a first, different size than a second size of packed data elements of the third packed data operand. Execution circuitry then executes the decoded single instruction to perform, for each packed data element position of the destination operand, a multiplication of a M N-sized packed data elements from the first and second packed data sources that correspond to a packed data element position of the third packed data source, add of results from these multiplications to a full-sized packed data element of a packed data element
(Continued)

position of the third packed data source, and storage of the addition result in a packed data element position destination corresponding to the packed data element position of the third packed data source, wherein M is equal to the full-sized packed data element divided by N.

20 Claims, 25 Drawing Sheets

(52) U.S. Cl.
CPC ...... *G06F 9/30036* (2013.01); *G06F 9/30105* (2013.01); *G06F 9/3818* (2013.01)

(56) References Cited

U.S. PATENT DOCUMENTS

| | | | |
|---|---|---|---|
| 5,880,984 | A | 3/1999 | Burchfiel et al. |
| 5,953,241 | A | 9/1999 | Hansen et al. |
| 6,014,684 | A | 1/2000 | Hoffman |
| 6,385,634 | B1 | 5/2002 | Peleg et al. |
| 6,944,747 | B2 | 9/2005 | Nair |
| 7,392,276 | B2 | 6/2008 | Dupaquis et al. |
| 7,430,578 | B2 | 9/2008 | Debes |
| 8,316,071 | B2 | 11/2012 | Hurd et al. |
| 8,396,915 | B2 | 3/2013 | Peleg |
| 8,458,442 | B2 | 6/2013 | Eichenberger et al. |
| 8,990,282 | B2 | 3/2015 | Lutz |
| 9,104,510 | B1 | 8/2015 | Rub |
| 9,417,843 | B2 | 8/2016 | Blomgren et al. |
| 9,465,611 | B2 | 10/2016 | Taunton et al. |
| 9,785,433 | B2 | 10/2017 | Espasa et al. |
| 9,864,602 | B2 | 1/2018 | Ould-Ahmed-Vall et al. |
| 10,146,535 | B2 | 12/2018 | Corbal et al. |
| 10,489,063 | B2 | 11/2019 | Mishra et al. |
| 11,023,231 | B2 | 6/2021 | Dubtsov et al. |
| 2004/0073589 | A1* | 4/2004 | Debes ............... G06F 9/30025 712/E9.034 |
| 2014/0006755 | A1 | 1/2014 | Gueron et al. |
| 2014/0195783 | A1 | 7/2014 | Karthikeyan et al. |
| 2019/0042236 | A1* | 2/2019 | Heinecke ............ G06F 9/30014 |
| 2019/0227797 | A1* | 7/2019 | Heinecke ............. G06F 9/3887 |
| 2019/0347310 | A1 | 11/2019 | Valentine et al. |
| 2020/0241873 | A1 | 7/2020 | Valentine et al. |

FOREIGN PATENT DOCUMENTS

| | | |
|---|---|---|
| CN | 104951401 A | 9/2015 |
| CN | 106030510 A | 10/2016 |
| TW | 242678 B | 3/1995 |
| TW | I362186 | 4/2012 |
| TW | 201506782 A | 2/2015 |
| TW | 201523439 A | 6/2015 |
| WO | 2018/075052 | 4/2018 |

OTHER PUBLICATIONS

European Patent Office, Response to Communication Pursuant to Article 94(3) filed Sep. 2, 2021 in European Patent Application No. 16919077.4 (6 pages).
Taiwan Patent Office, Office Action dated Mar. 28, 2022 in Taiwan Patent Application No. 110143839 (12 pages).
United States Patent Office, Notice of Allowance dated Jul. 11, 2022 in U.S. Appl. No. 17/465,905 (30 pages).
European Patent Office, Office Action dated Feb. 8, 2022 in European Patent Application No. 21207379.5 (11 pages).
Intel Corporation, "Intel 64 and IA-32 Architectures Software Developer's Manual, vol. 2 (2A , 2B & 2C, Instruction Set Reference, A-Z", XP055554547, Jun. 2, 2015, pp. 4-118, 4-119, 4-120 and 4-121.
Di et al., "Run-time reconfigurable power-aware pipelined signed array multiplier design," Signals, Circuits and Systems, SCS 2003, International Symposium on Jul. 10-11, 2003, pp. 405-408, vol. 2.
European Patent Office, Office Action dated Feb. 11, 2022 in European Patent Application No. 21207395.1 (11 pages).
European Patent Office, Office Action dated Feb. 16, 2022 in European Patent Application No. 21207389.4 (11 pages).
European Patent Office, Office Action dated Feb. 23, 2022 in European Patent Application No. 21207387.8 (12 pages).
Advanced Micro Devices, "AMD Technology, AMD64 Architecture Programmer's Manual vol. 6: 128-Bit and 256-Bit XOP and FMA4 Instructions", Nov. 30, 2009, XP055574031, 84 pages.
AMD, "AMD64 Technology AMD64 Architecture Programmer's Manual vol. 1: Application Programming," Rev. 3.20, May 2013, 386 pgs.
Nvidia, "Parallel Thread Execution ISA", V3.2, Application Guide, Jul. 31, 2013, 248 pgs.
European Patent Office, Extended European Search Report dated Jun. 15, 2020 in European Patent Application No. 16919077.4, 11 pgs.
European Patent Office, Office Action dated Apr. 29, 2021 in European Patent Application No. 16919077.4, 9 pgs.
Taiwan Patent Office, Office Action dated Jul. 29, 2021 in Taiwan Patent Applicatino No. 106130175, 19 pgs.
AMD 64 Technology, AMD64 Architecture Programmer's Manual vol. 6:128-Bit and 256-Bit XOP and FMA4 Instructions, Pub. No. 43479, Rev. 3.04, Nov. 2009, pp. 229-234.
Intel Corporation, Intel 64 and IA-32 Architectures Software Developer's Mnaual, vol. 2, Instruction Set Reference, A-Z, Order No. 325383-060US, Sep. 216, pp. 4-298-4-303.
U.S. Appl. No. 17/468,258, filed Sep. 7, 2021, entitled "Systems, Apparatuses, and Methods for Fused Multiply Add," by Robert Valentine et al., 93 Pages.
U.S. Appl. No. 17/487,611, filed Sep. 28, 2021, entitled "Systems, Apparatuses, and Methods for Fused Multiply Add," by Robert Valentine et al., 88 Pages.
U.S. Appl. No. 17/465,905, filed Sep. 3, 2021, entitled "Systems, Apparatuses, and Methods for Fused Multiply Add," by Robert Valentine et al., 93 Pages.
International Preliminary Report on Patentability for Application No. PCT/US2016/057991, dated May 2, 2019, 10 pages.
International Search Report and Written Opinion for Application No. PCT/US2016/057991, dated Jul. 20, 2017, 12 pages.
United States Patent Office, Notice of Allowance dated Aug. 4, 2022 in U.S. Appl. No. 17/468,258 (34 pages).
United States Patent Office, Notice of Allowance dated Aug. 16, 2022 in U.S. Appl. No. 17/487,611 (38 pages).
European Patent Office, Response to Communication Pursuant to Article 94(3) filed Aug. 30, 2022 in European Patent Application No. 16919077.4 (15 pages).
European Patent Office, Response to Search Report filed Sep. 16, 2022 in European Patent Application No. 21207389.4 (15 pages).
European Patent Office, Response to Search Report filed Sep. 16, 2022 in European Patent Application No. 21207395.1 (15 pages).
European Patent Office, Response to Search Report filed Sep. 16, 2022 in European Patent Application No. 21207379.5 (15 pages).
Chinese Patent Office, Office Action dated Sep. 26, 2022 in Chinese Patent Application No. 201680089435.5 (6 pages).
European Patent Office, Communication pursuant to Article 94(3) EPC dated Oct. 11, 2022 in European Patent Application No. 21207389.4 (4 pages).
European Patent Office, Communication pursuant to Article 94(3) EPC dated Oct. 11, 2022 in European Patent Application No. 21207395.1 (4 pages).
European Patent Office, Communication pursuant to Article 94(3) EPC dated Oct. 11, 2022 in European Patent Application No. 21207379.5 (4 pages).
European Patent Office, Response to Search Report filed Oct. 21, 2022 in European Patent Application No. 21207387.8 (22 pages).

* cited by examiner

ACCUMULATOR 2X INPUT SIZES 201

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 203

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 205

| SOURCES | BITS | ACCUMULATOR | BITS |
|---|---|---|---|
| BYTE | 8 | INT64/DPFP | 64 |

FIG. 2

```
VPMADDWDACCD dest, src1, src2
(KL,VL)=(4,128), (8,256), (16,512)
ORIGDEST := DEST
FOR i := 0 TO KL-1:
    IF k1[i] or *no writemask*:
        if SRC2 is memory and EVEX.b == 1:
            t := SRC2.dword[0]
        ELSE:
            t := SRC2.dword[i]
        p1dword := SRC1.word[2*i] * t.word[0]
        p2dword := SRC1.word[2*i+1] * t.word[1]
        DEST.dword[i] := ORIGDEST.dword[i] + p1dword + p2dword
    ELSE IF *zeroing*:
        DEST.dword[i] := 0
    ELSE: // Merge masking, dest element unchanged
        DEST.dword[i] := ORIGDEST.dword[i]
DEST[MAX_VL-1:VL] := 0
```

FIG. 6

```
VPMADDWDACCSSD dest, src1, src2
(KL,VL)=(4,128),(8,256),(16,512)
ORIGDEST := DEST
FOR i := 0 TO KL-1:
    IF k1[i] or *no writemask*:
        if SRC2 is memory and EVEX.b == 1:
            t := SRC2.dword[0]
        ELSE:
            t := SRC2.dword[i]
        p1dword := SRC1.word[2*i] * t.word[0]
        p2dword := SRC1.word[2*i+1] * t.word[1]
        DEST.dword[i] := SIGNED_DWORD_SATURATE(ORIGDEST.dword[i] + p1dword + p2dword)
    ELSE IF *zeroing*:
        DEST.dword[i] := 0
    ELSE: // Merge masking, dest element unchanged
        DEST.dword[i] := ORIGDEST.dword[i]
DEST[MAX_VL-1:VL] := 0
```

FIG. 8

```
VPMADDUBSWACCD dest, src1, src2
(KL,VL)=(4,128),(8,256),(16,512)
ORIGDEST := DEST
FOR i := 0 TO KL-1:
    IF k1[i] or *no writemask*:
        // Elements of SRC1 are zero-extended to 16b and
        // byte elements of SRC2 are sign extended to 16b before multiplication.
        if SRC2 is memory and EVEX.b == 1:
            t := SRC2.dword[0]
        ELSE:
            t := SRC2.dword[i]
        p1word := ZERO_EXTEND(SRC1.byte[4*i]) * SIGN_EXTEND(t.byte[0])
        p2word := ZERO_EXTEND(SRC1.byte[4*i+1]) * SIGN_EXTEND(t.byte[1])
        p3word := ZERO_EXTEND(SRC1.byte[4*i+2]) * SIGN_EXTEND(t.byte[2])
        p4word := ZERO_EXTEND(SRC1.byte[4*i+3]) * SIGN_EXTEND(t.byte[3])
        DEST.dword[i] := ORIGDEST.dword[i] + p1word + p2word + p3word + p4word
    ELSE IF *zeroing*:
        DEST.dword[i] := 0
    ELSE: // Merge masking, dest element unchanged
        DEST.dword[i] := ORIGDEST.dword[i]
DEST[MAX_VL-1:VL] := 0
```

FIG. 10

```
VPMADDUBSWACCSSD dest, src1, src2
(KL,VL)=(4,128),(8,256),(16,512)
ORIGDEST := DEST
FOR i := 0 TO KL-1:
    IF k1[i] or *no writemask*:
        // Elements of SRC1 are zero-extended to 16b and
        // byte elements of SRC2 are sign extended to 16b before multiplication.
        IF SRC2 is memory and EVEX.b == 1:
            t := SRC2.dword[0]
        ELSE:
            t := SRC2.dword[i]
        p1word := ZERO_EXTEND(SRC1.byte[4*i]) * SIGN_EXTEND(t.byte[0])
        p2word := ZERO_EXTEND(SRC1.byte[4*i+1]) * SIGN_EXTEND(t.byte[1])
        p3word := ZERO_EXTEND(SRC1.byte[4*i+2]) * SIGN_EXTEND(t.byte[2])
        p4word := ZERO_EXTEND(SRC1.byte[4*i+3]) * SIGN_EXTEND(t.byte[3])
        DEST.dword[i] := SIGNED_DWORD_SATURATE(ORIGDEST.dword[i] + p1word + p2word + p3word + p4word)
    ELSE IF *zeroing*:
        DEST.dword[i] := 0
    ELSE: // Merge masking, dest element unchanged
        DEST.dword[i] := ORIGDEST.dword[i]
DEST[MAX_VL-1:VL] := 0
```

FIG. 12

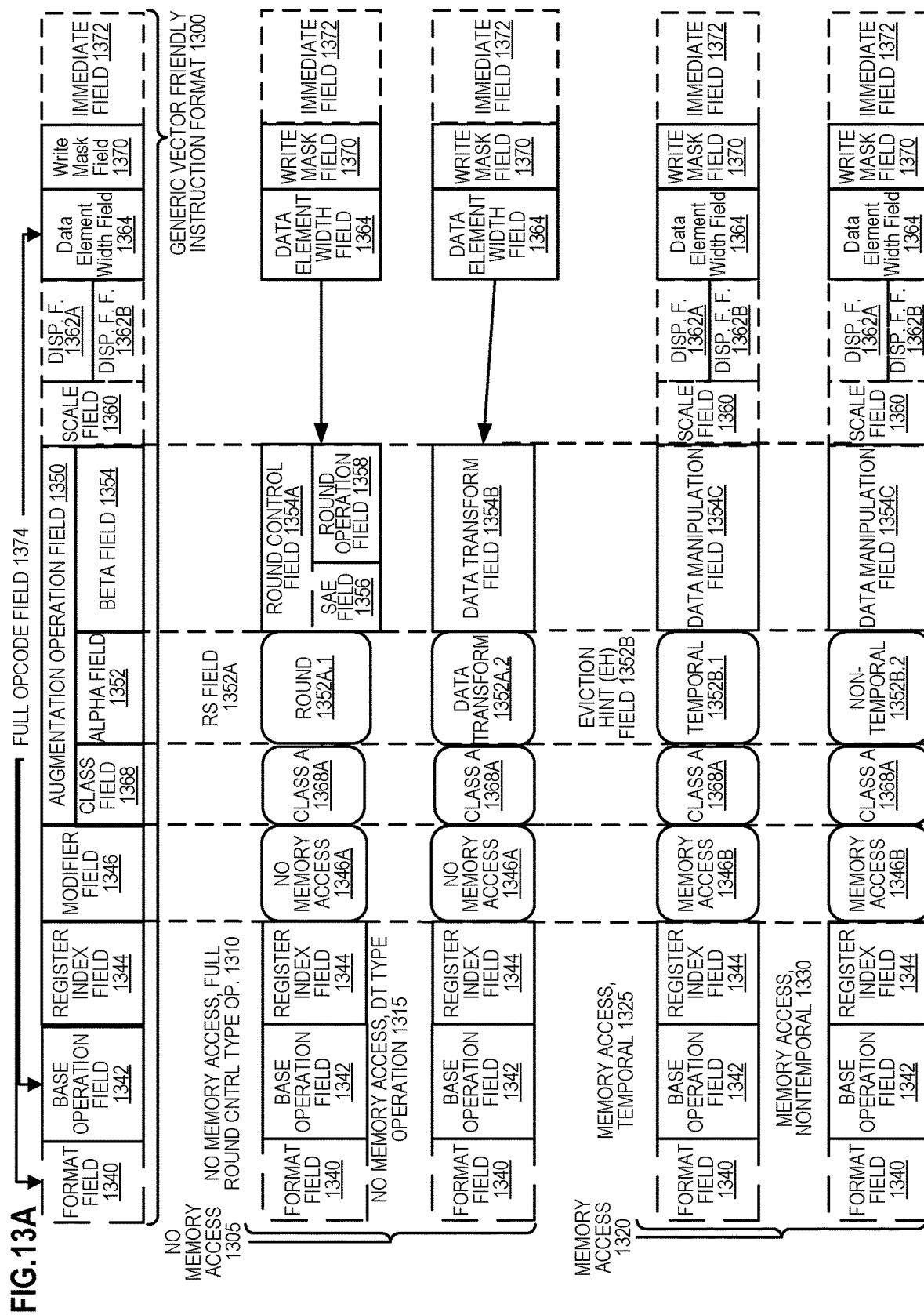

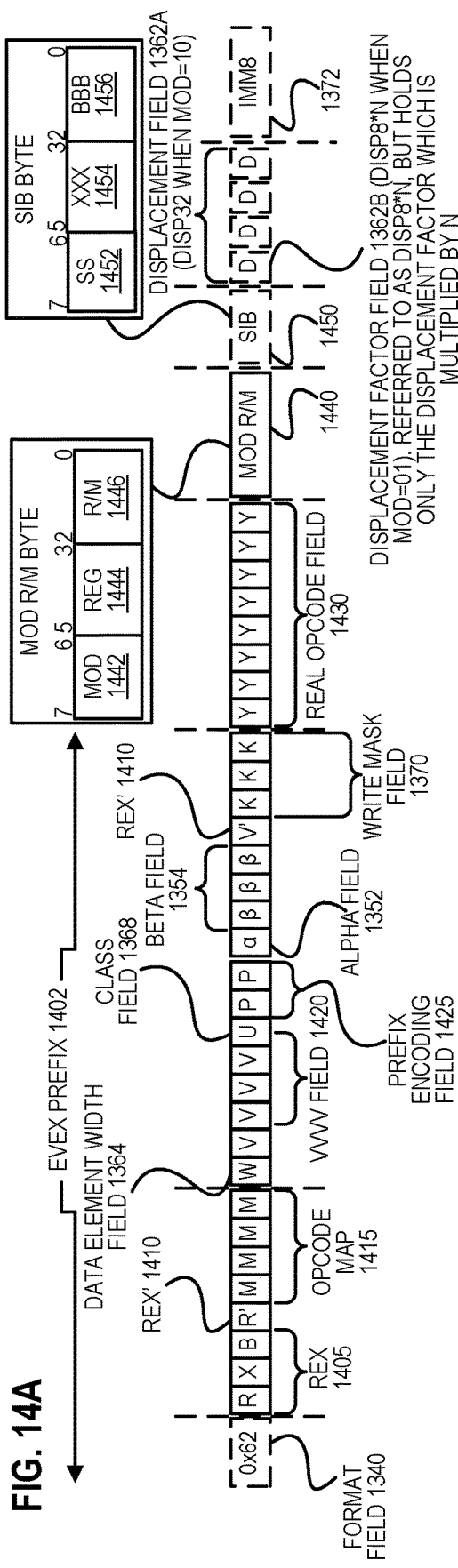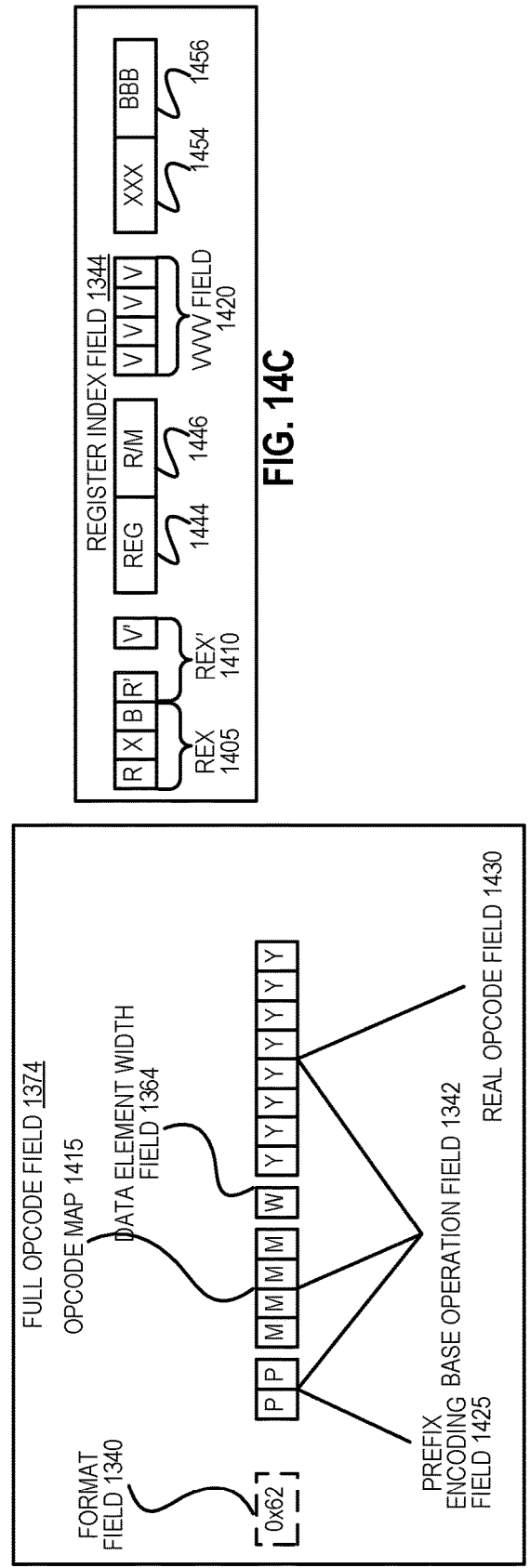

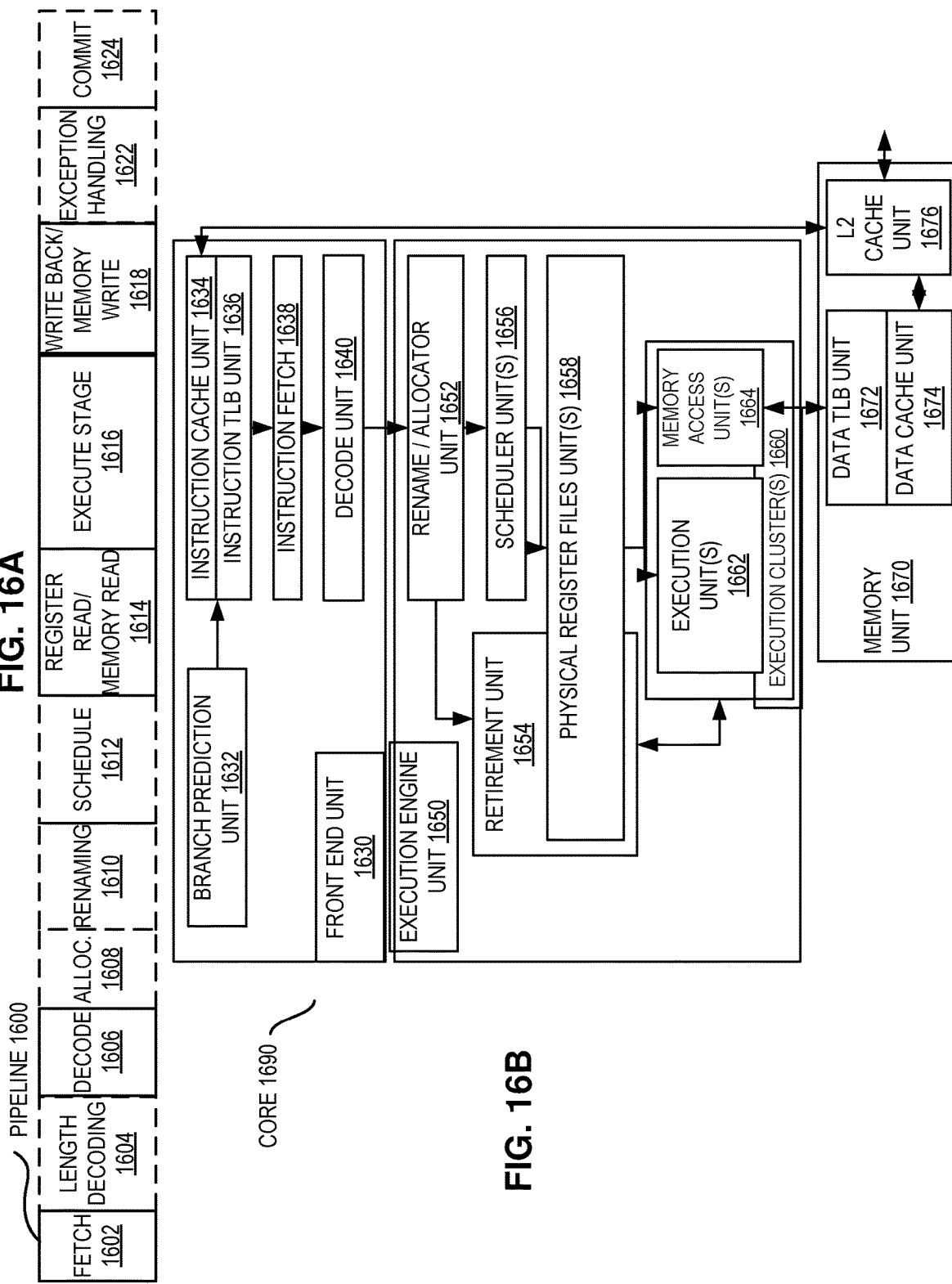

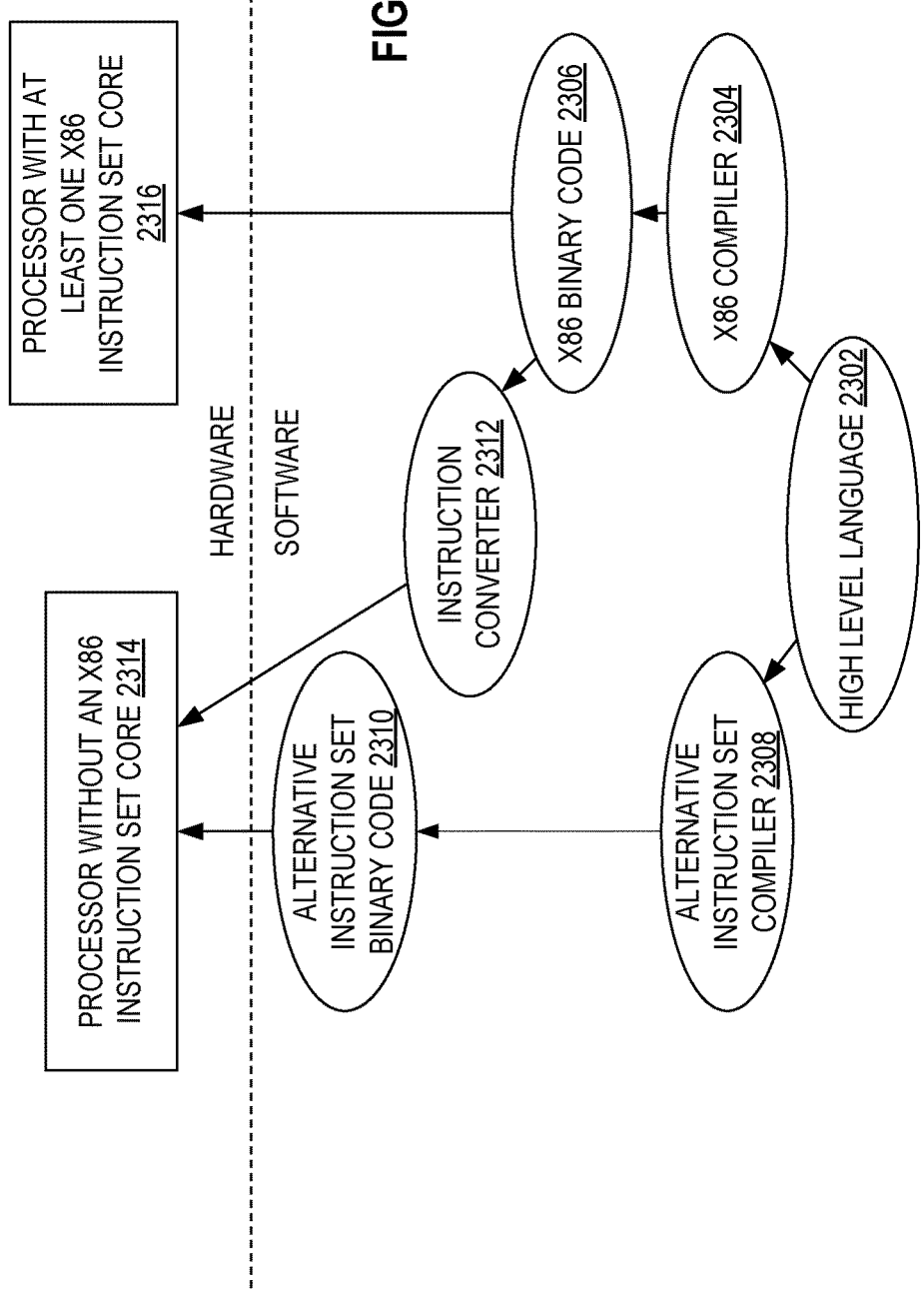

SYSTEMS, APPARATUSES, AND METHODS FOR FUSED MULTIPLY ADD

CROSS-REFERENCE TO RELATED APPLICATION

This application is a continuation of U.S. patent application Ser. No. 16/338,324, filed Mar. 29, 2019, which is a § 371 national stage of international application PCT/US2016/057991, which filed Oct. 20, 2016, the content of each of the above applications is hereby incorporated by reference.

FIELD OF INVENTION

The field of invention relates generally to computer processor architecture, and, more specifically, to instructions which when executed cause a particular result.

BACKGROUND

A common operation in linear algebra is a multiply accumulate operation (e.g., c=c+a*b). The multiply accumulate is typically a sub-operation in a stream of operations, for instance, a dot product between two vectors, which could also be a single product of a column and a row in a matrix multiply.
For example,
C=0
For (I)

$$C+=A[I]*B[I]$$

BRIEF DESCRIPTION OF THE DRAWINGS

The present invention is illustrated by way of example and not limitation in the figures of the accompanying drawings, in which like references indicate similar elements and in which:

FIG. 2 illustrates power-of-two sized SIMD implementations wherein the accumulators use input sizes that are larger than the inputs to the multipliers according to an embodiment;

FIG. 6 illustrates an embodiment of pseudo code for implementing this instruction in hardware;

FIG. 8 illustrates an embodiment of pseudo code for implementing this instruction in hardware;

FIG. 10 illustrates an embodiment of pseudo code for implementing this instruction in hardware;

FIG. 12 illustrates an embodiment of pseudo code for implementing this instruction in hardware;

FIG. 13A is a block diagram illustrating a generic vector friendly instruction format and class A instruction templates thereof according to embodiments of the invention;

FIG. 14A is a block diagram illustrating an exemplary specific vector friendly instruction format according to embodiments of the invention;

FIG. 14B is a block diagram illustrating the fields of the specific vector friendly instruction format that make up the full opcode field according to one embodiment of the invention;

FIG. 14C is a block diagram illustrating the fields of the specific vector friendly instruction format that make up the register index field according to one embodiment of the invention;

FIG. 16A is a block diagram illustrating both an exemplary in-order pipeline and an exemplary register renaming, out-of-order issue/execution pipeline according to embodiments of the invention;

FIG. 16B is a block diagram illustrating both an exemplary embodiment of an in-order architecture core and an exemplary register renaming, out-of-order issue/execution architecture core to be included in a processor according to embodiments of the invention;

FIG. 23 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In processing large data sets, the memory and computation density can be increased by sizing the datatypes as small as possible. If the input terms come from sensor data, then 8 or 16-bit integer data may be expected as inputs. Neural network calculations, which also can be coded to match this dense format, typically have 'small' numbers as input terms. However, the accumulator is summing products, implying that the accumulator should tolerate two times the number of bits of the input terms (the nature of multiplication) and potentially much more in order to avoid overflow or saturation at any point in the computation.

Figure 1:
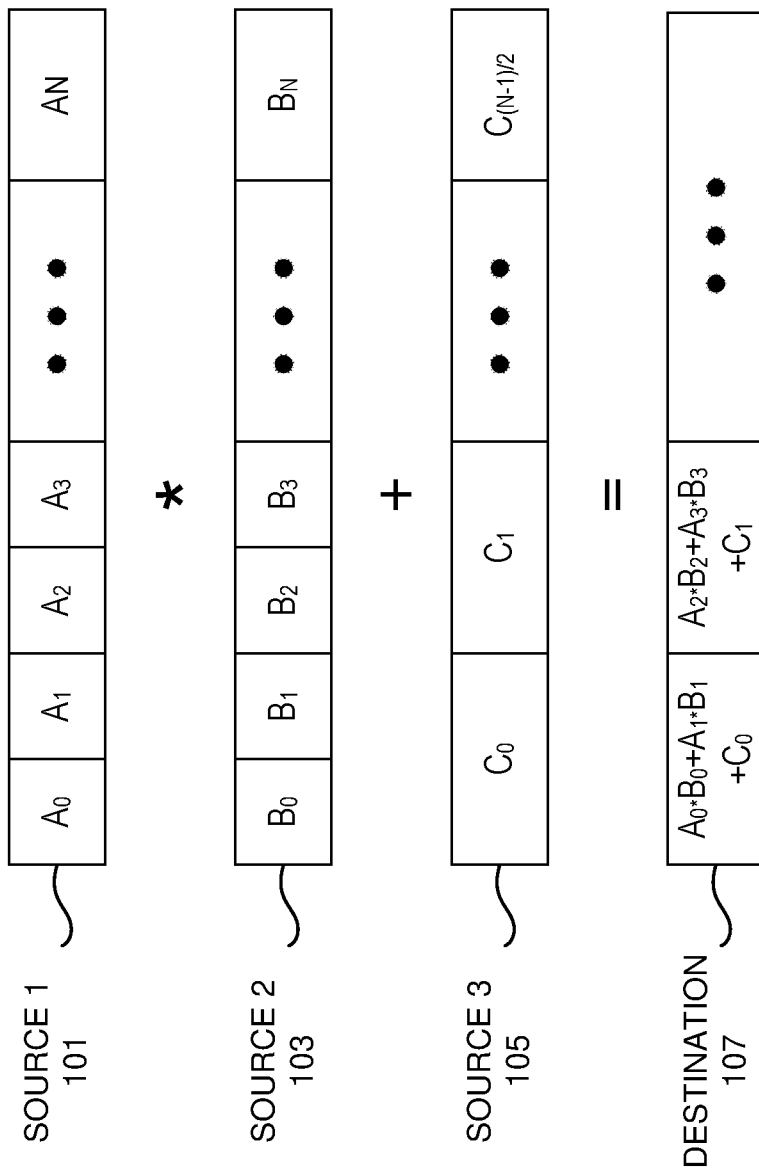
FIG. 1 illustrates an exemplary execution of a fused multiply accumulate instruction that uses different sized operands according to an embodiment.

Detailed herein are embodiments that attempt to keep the input data size small and sum to a larger accumulator in a chain of fused multiply accumulate (FMA) operation. FIG. 1 illustrates an exemplary execution of a fused multiply accumulate instruction that uses different sized operands according to an embodiment. A first source 101 (e.g., a SIMD or vector register) and a second source 103 store "half-sized" packed data elements with respect to a third source 105 (e.g., single input, multiple data (SIMD) or vector register) that stores full-size packed data elements used for accumulation. Any set of values where the packed data element sizes are in in this manner are supportable.

As shown, values stored in packed data elements of the same position of the first and second sources 101 and 103 are multiplied together. For example, A0*B0, A1*B1, etc. A result of two such "half-sized" packed data element multiplications are added to a corresponding "full-sized" packed data element from the third source 105. For example, A0*B0+A1*B1+C0, etc.

The result is stored in a destination 107 (e.g., a SIMD register) that has packed data element sizes that are at least "full-sized." In some embodiments, the third source 105 and the destination 107 are the same.

FIG. 2 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources) table 201 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-integer or double-precision floating-point (DPFP) values that are 64-bit in size. Using FIG. 1 as an example, when the packed data element sizes of source 1 101 and source 2 103 are 8 bits, then the accumulator will use 16-bit sized data elements from source 3 103. When the packed data element sizes of source 1 101 and source 2 103 are 16 bits, then the accumulator will use 32-bit sized data elements from source 3 103. When the packed data element sizes of source 1 101 and source 2 103 are 32 bits, then the accumulator will use 64-bit sized data elements from source 3 103.

For an accumulator having 4× input sizes (in other words, the accumulator input value is four times the size of the packed data element sizes of the sources) table 203 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size. Using FIG. 1 as an example, when the packed data element sizes of source 1 101 and source 2 103 are 8 bits, then the accumulator will use 32-bit sized data elements from source 3 103. When the packed data element sizes of source 1 101 and source 2 103 are 16 bits, then the accumulator will use 64-bit sized data elements from source 3 103.

For an accumulator having 8× input sizes (in other words, the accumulator input value is eight times the size of the packed data element sizes of the sources) table 205 illustrates a configuration. For byte sized sources, the accumulator uses 64-bit integer or double-precision floating-point (DPFP) values that are 64-bit in size. Using FIG. 1 as an example, when the packed data element sizes of source 1 101 and source 2 103 are 8 bits, then the accumulator will use 64-bit sized data elements from source 3 103.

Detailed herein are embodiments of instructions and circuitry for fused multiply accumulate. In some embodiments, the fused multiply accumulate instruction is of mixed precision and/or uses horizontal reduction as detailed herein.

Detailed herein are embodiments of an instruction that when executed causes, for each packed data element position of the destination, a multiplication of a M N-sized packed data elements from a first and a second source that correspond to a packed data element position of a third source, and add results from these multiplications to a full-sized (relative to the N-sized packed data elements) packed data element of a packed data element position of the third source, and store the result the addition(s) in a packed data element position destination corresponding to the packed data element position of the third source, wherein M is equal to the full-sized packed data element divided by N. For example, when M is equal to 2 (e.g., a full-sized packed data element is 16 bits and N is 8 bits), consecutive packed data elements from the first source are multiplied to respective consecutive packed data elements of the second source.

As such, detailed herein are embodiments of an instruction that when executed causes a multiplication of a pair of half-sized packed data elements from a first and a second source, and adds results from these multiplications to a full-sized (relative to the half-sized packed data elements) packed data element of a third source and stores the result in a destination. In other words, in some embodiments, for each data element position i of the third source, there is a multiplication of data from a data element position [2i] of the first source to data from a data element position [2i] of the second source to generate a first result, a multiplication of data from a data element position [2i+1] of the first source) to data from a data element position [2i+1] of the second source to generate a second result, and an addition of the first and second results to data from the data element position i of the third source. In some embodiments, saturation is performed at the end of the addition. In some embodiments, the data from the first and/or second sources is sign extended prior to multiplication.

Further, detailed herein are embodiments of an instruction that when executed causes a multiplication of a quartet of quarter-sized packed data elements from a first and a second source, and adds results from these multiplications to a full-sized (relative to the quarter-sized packed data elements) packed data element of a third source and stores the result in a destination. In other words, in some embodiments, for each data element position i of the third source, there is a multiplication of data from a data element position [4i] of the first source to data from a data element position [4i] of the second source to generate a first result, a multiplication of data from a data element position [4i+1] of the first source) to data from a data element position [4i+1] of the second source to generate a second result, a multiplication of data from a data element position [4i+2] of the first source) to data from a data element position [4i+2] of the second source to generate a second result, a multiplication of data from a data element position [4i+3] of the first source) to data from a data element position [4i+3] of the second source to generate a second result, and an addition the first, second, third, and fourth results to data from the data element position i of the third source. In some embodiments, saturation is performed at the end of the addition. In some embodiments, the data from the first and/or second sources is sign extended prior to multiplication.

In some embodiments of integer versions of the instruction, saturation circuitry is used to preserve a sign of an operand when the addition results in a value that is too big. In particular, the saturation evaluation occurs on the infinite precision result in between the multi-way-add and the write to the destination. There are instances where the largest positive or least negative number cannot be trusted since it may reflect that a calculation exceeded the container space. However, this can at least be checked. When the accumulator is floating point and the input terms are integer, then the question to be answered is how and when is the conversion from the integer products was done such that there is no double-rounding from the partial terms to the final floating point accumulation. In some embodiments, the sum of products and the floating point accumulator are turned into infinite precision values (fixed point numbers of hundreds of bits), the addition is performed, and then a single rounding to the actual accumulator type is performed.

In some embodiments, when the input terms are floating point operands, rounding and dealing with special values (infinities and not a numbers (NANs)), the ordering of faults in the calculation needs solving in the definition. In some embodiments, an order of operations is specified that is emulated and ensures that the implementation delivers faults in that order. It may be impossible for such an implementation to avoid multiple roundings in the course of the calculation. A single precision multiply can fill completely into a double precision result regardless of input values. However, the horizontal add of two such operations may not fit into a double without rounding, and the sum may not fit the accumulator without an additional rounding. In some embodiments, rounding is performed during the horizontal summation and once during the accumulation.

Figure 3:
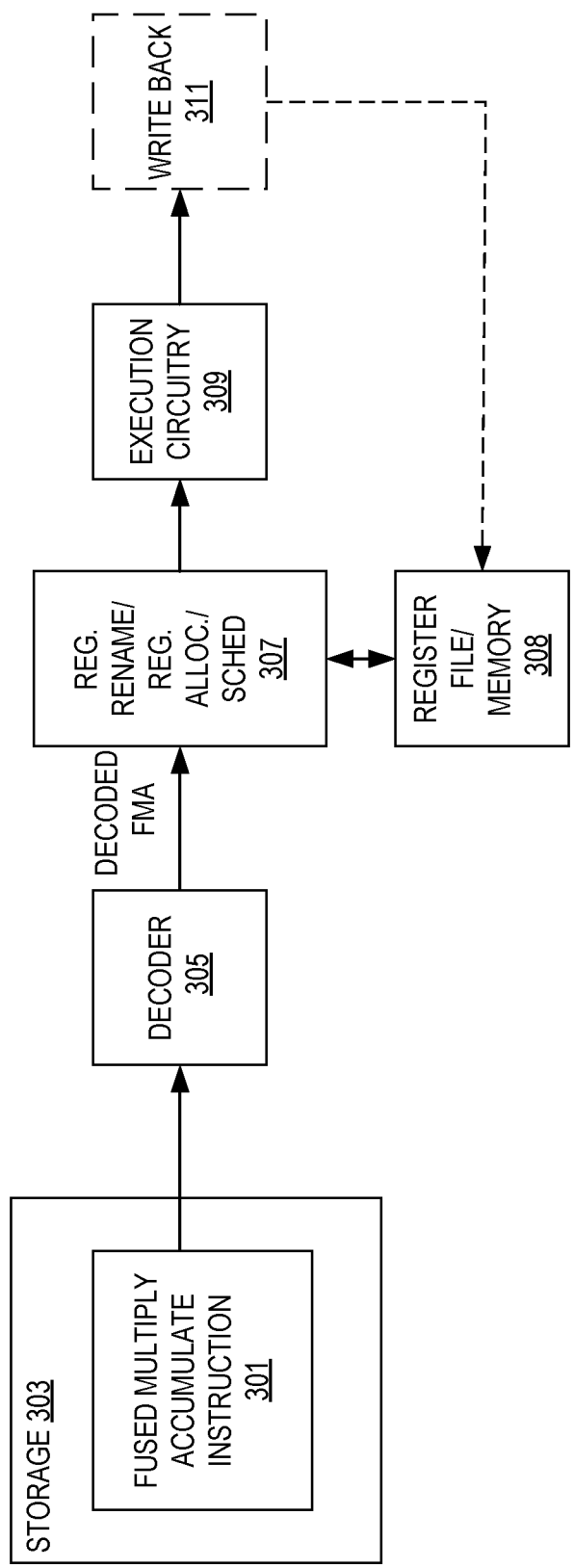
FIG. 3 illustrates an embodiment of hardware to process an instruction such as a fused multiply accumulate instruction.

FIG. 3 illustrates an embodiment of hardware to process an instruction such as a fused multiply accumulate instruction. As illustrated, storage 303 stores a fused multiply accumulate instruction 301 to be executed causes, for each packed data element position of the destination, a multiplication of a M N-sized packed data elements from a first and a second source that correspond to a packed data element position of a third source, an add of results from these multiplications to a full-sized (relative to the N-sized packed data elements) packed data element of a packed data element position of the third source, and store of the result the addition(s) in a packed data element position destination corresponding to the packed data element position of the third source, wherein M is equal to the full-sized packed data element divided by N.

The instruction 301 is received by decode circuitry 305. For example, the decode circuitry 305 receives this instruction from fetch logic/circuitry. The instruction includes fields for the first, second, and third sources, and a destination. In some embodiments, the sources and destination are registers. Additionally, in some embodiments, the third source and the destination are the same. The opcode and/or prefix of the instruction 301 includes an indication of source and destination data element sizes {B/W/D/Q} of byte, word, doubleword, and quadword, and a number of iterations.

More detailed embodiments of at least one instruction format will be detailed later. The decode circuitry 305 decodes the instruction into one or more operations. In some embodiments, this decoding includes generating a plurality of micro-operations to be performed by execution circuitry (such as execution circuitry 311). The decode circuitry 305 also decodes instruction prefixes.

In some embodiments, register renaming, register allocation, and/or scheduling circuitry 307 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments). Registers (register file) and/or memory 308 store data as operands of the instruction to be operated on by execution circuitry 309. Exemplary register types include packed data registers, general purpose registers, and floating point registers.

Execution circuitry 309 executes the decoded instruction.

In some embodiments, retirement/write back circuitry 311 architecturally 1 commits the destination register into the registers or memory and retires the instruction.

An embodiment of a format for a fused multiply accumulate instruction is FMA[SOURCESIZE{B/W/D/Q}] [DESTSIZE{B/W/D/Q}] DSTREG, SRC1, SRC2, SRC3. In some embodiments, FMA[SOURCESIZE{B/W/D/Q}] [DESTSIZE{B/W/D/Q}] is the opcode and/or prefix of the instruction. B/W/D/Q indicates the data element sizes of the sources/destination as byte, word, doubleword, and quadword. DSTREG is a field for the packed data destination register operand. SRC1, SRC2, and SRC3 are fields for the sources such as packed data registers and/or memory.

An embodiment of a format for a fused multiply accumulate instruction is FMA[SOURCESIZE{B/W/D/Q}] [DESTSIZE{B/W/D/Q}] DSTREG/SRC3, SRC1, SRC2. In some embodiments, FMA[SOURCESIZE{B/W/D/Q}] [DESTSIZE{B/W/D/Q}] is the opcode and/or prefix of the instruction. B/W/D/Q indicates the data element sizes of the sources/destination as byte, word, doubleword, and quadword. DSTREG/SRC3 is a field for the packed data destination register operand and a third source operand. SRC1, SRC2, and SRC3 are fields for the sources such as packed data registers and/or memory.

In some embodiments, the fused multiply accumulate instruction includes a field for a writemask register operand (k) (e.g., FMA[SOURCESIZE{B/W/D/Q}][DESTSIZE{B/W/D/Q}]{k} DSTREG/SRC3, SRC1, SRC2 or FMA [SOURCESIZE{B/W/D/Q}][DESTSIZE{B/W/D/Q}]{k}

DSTREG, SRC1, SRC2, SRC3). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the destination operand. The predicate operand is known as the opmask (writemask) register. The opmask is a set of architectural registers of size MAX_KL (64-bit). Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword (int32), double-precision floating-point (float64), integer quadword (int64). The length of a opmask register, MAX_KL, is sufficient to handle up to 64 elements with one bit per element, i.e. 64 bits. For a given vector length, each instruction accesses only the number of least significant mask bits that are needed based on its data type. An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2). a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be an XMM register (vm32x), a YMM register (vm32y), or a ZMM register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be an XMM register (vm64x), a YMM register (vm64y) or a ZMM register (vm64z).

Figure 4:
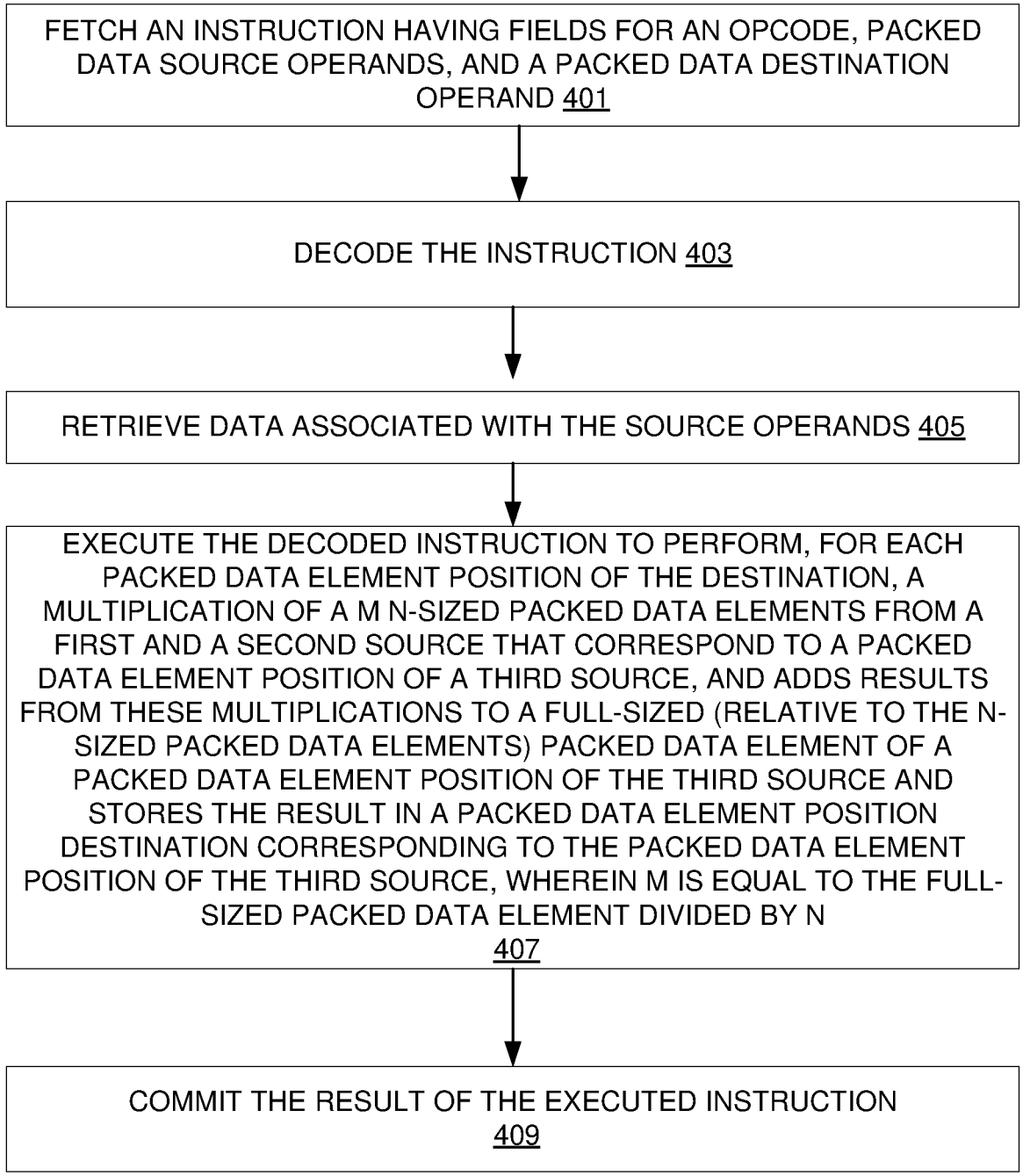
FIG. 4 illustrates an embodiment of method performed by a processor to process a fused multiply accumulate instruction.

FIG. 4 illustrates an embodiment of method performed by a processor to process a fused multiply accumulate instruction.

At 401, an instruction is fetched. For example, a fused multiply accumulate instruction is fetched. The fused multiply accumulate instruction includes an opcode, and fields for packed data source operands and a packed data destination operand as detailed above. In some embodiments, the fused multiply accumulate instruction includes a writemask operand. In some embodiments, the instruction is fetched from an instruction cache.

The fetched instruction is decoded at 403. For example, the fetched fused multiply accumulate instruction is decoded by decode circuitry such as that detailed herein.

Data values associated with the source operands of the decoded instruction are retrieved at 405.

At 407, the decoded instruction is executed by execution circuitry (hardware) such as that detailed herein. For the fused multiply accumulate instruction, the execution will cause, for each packed data element position of the destination, a multiplication of a M N-sized packed data elements from a first and a second source that correspond to a packed data element position of a third source, add of results from these multiplications to a full-sized (relative to the N-sized packed data elements) packed data element of a packed data element position of the third source, and store of the result the addition(s) in a packed data element position destination corresponding to the packed data element position of the third source, wherein M is equal to the full-sized packed data element divided by N.

In some embodiment, the instruction is committed or retired at 409.

Figure 5:
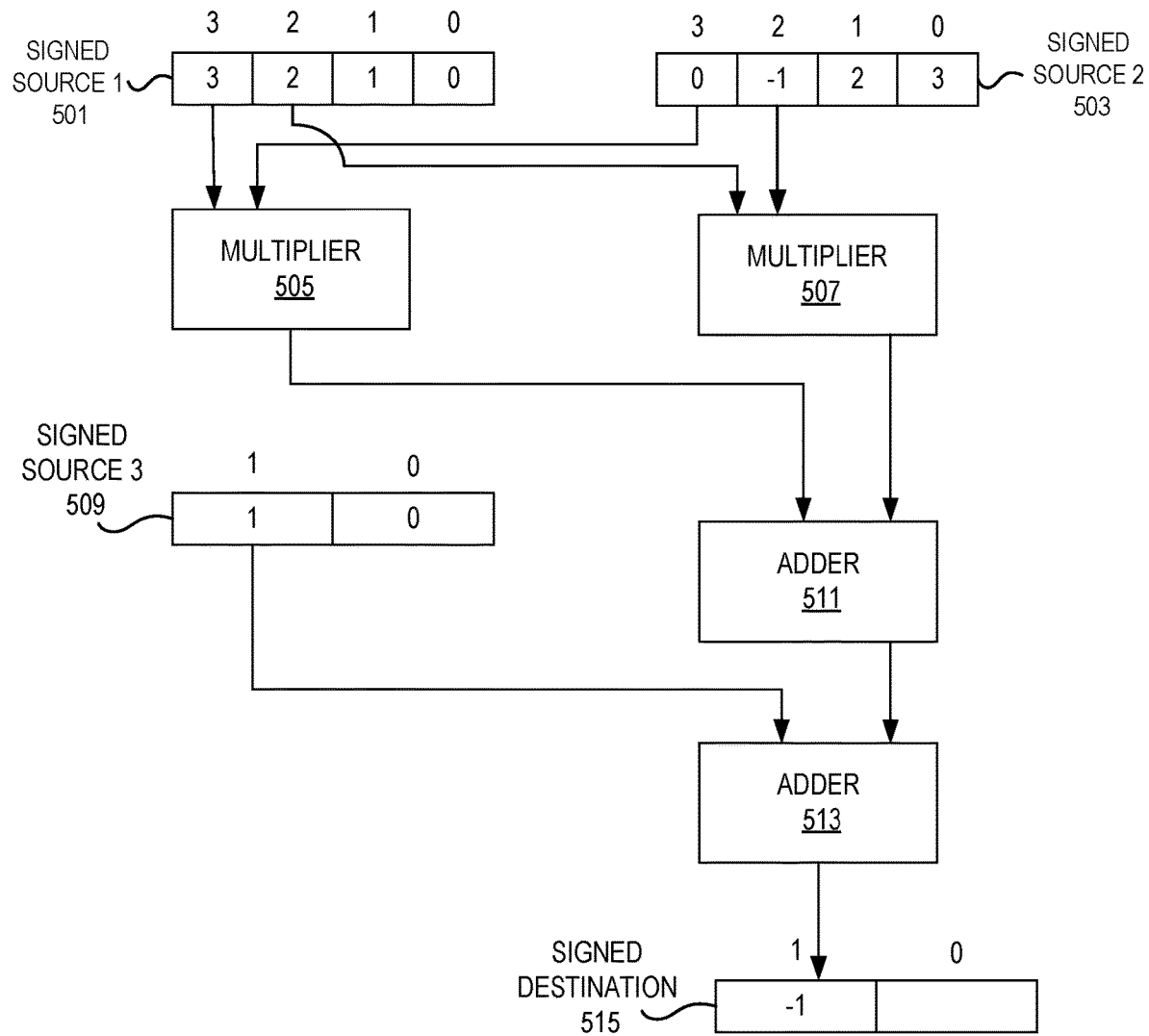
FIG. 5 illustrates an embodiment of a subset of the execution of a fused multiply accumulate.

FIG. 5 illustrates an embodiment of a subset of the execution of a fused multiply accumulate. In particular, this illustrates execution circuitry of an iteration of one packed data element position of the destination. In this embodiment, the fused multiply accumulate is operating on signed sources wherein the accumulator is 2× the input data size. FIG. 6 illustrates an embodiment of pseudo code for implementing this instruction in hardware.

A first signed source (source 1 501) and a second signed source (source 2 503) each have four packed data elements. Each of these packed data elements stores signed data such as floating point data. A third signed source 509 (source 3) has two packed data elements of which each stores signed data. The sizes of the first and second signed sources 501 and 503 are half that of the third signed source 509. For example, the first and second signed sources 501 and 503 could have 32-bit packed data elements (e.g., single precision floating point) the third signed source 509 could have 64-bit packed data elements (e.g., double precision floating point).

In this illustration, only the two most significant packed data element positions of the first and second signed sources 501 and 503 and the most significant packed data element position of the third signed source 509 are shown. Of course, the other packed data element positions would also be processed.

As illustrated, packed data elements are processed in pairs. For example, the data of the most significant packed data element positions of the first and second signed sources 501 and 503 are multiplied using a multiplier circuit 505, and the data from second most significant packed data element positions of the first and second signed sources 501 and 503 are multiplied using a multiplier circuit 507. In some embodiments, these multiplier circuits 505 and 507 are reused for other packed data elements positions. In other embodiments, additional multiplier circuits are used so that the packed data elements are processed in parallel. In some contexts, parallel execution is done using lanes that are the size of the signed third source 509. The results of each of the multiplications are added using addition circuitry 511.

The result of the addition of the results of the multiplications is added to the data from most significant packed data element position of the signed source 3 509 (using a different adder 513 or the same adder 511).

Finally, the result of the second addition is stored into the signed destination 515 in a packed data element position that corresponds to the packed data element positon used from the signed third source 509. In some embodiments, a writemask is applied to this storage such that if a corresponding writemask (bit) is set, the storage happens, and, if not set, the storage does not happen.

Figure 7:
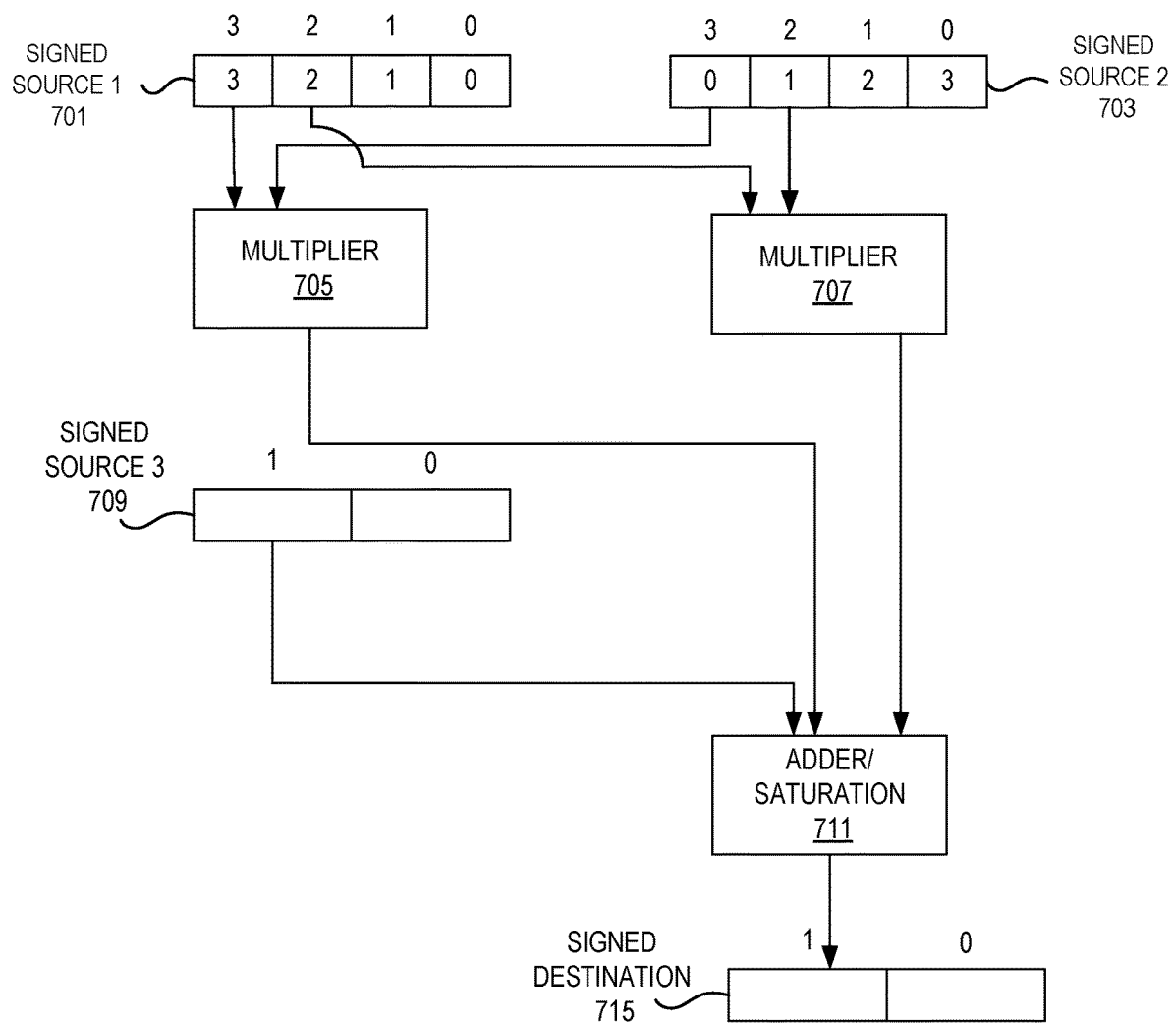
FIG. 7 illustrates an embodiment of a subset of the execution of a fused multiply accumulate.

FIG. 7 illustrates an embodiment of a subset of the execution of a fused multiply accumulate. In particular, this illustrates execution circuitry of an iteration of one packed data element position of the destination. In this embodiment, the fused multiply accumulate is operating on signed sources wherein the accumulator is 2× the input data size. FIG. 8 illustrates an embodiment of pseudo code for implementing this instruction in hardware.

A first signed source (source 1 701) and a second signed source (source 2 703) each have four packed data elements. Each of these packed data elements stores signed data such as integer data. A third signed source 709 (source 3) has two packed data elements of which each stores signed data. The sizes of the first and second signed sources 701 and 703 are half that of the third signed source 709. For example, the first and second signed sources 701 and 703 could have 32-bit packed data elements (e.g., single precision floating point) the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added to the signed third source 709 using addition/saturation circuitry 711.

Addition/saturation (accumulator) circuitry 711 preserves a sign of an operand when the addition results in a value that is too big. In particular, saturation evaluation occurs on the infinite precision result between the multi-way-add and the write to the signed destination 715. When the accumulator 711 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

The result of the addition and saturation check is stored into the signed destination 715 in a packed data element position that corresponds to the packed data element positon used from the signed third source 709. In some embodiments, a writemask is applied to this storage such that if a corresponding writemask (bit) is set, the storage happens, and, if not set, the storage does not happen.

Figure 9:
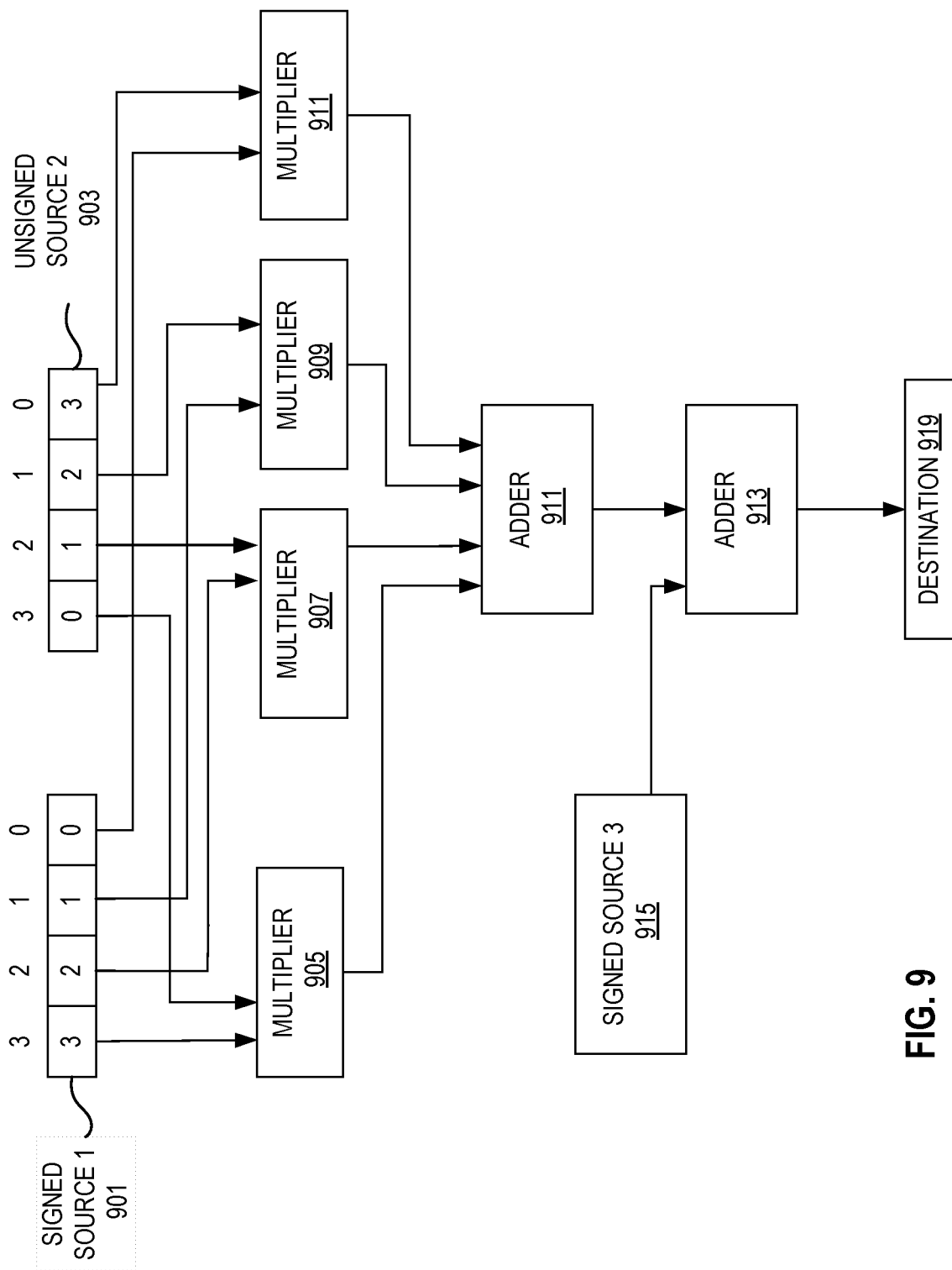
FIG. 9 illustrates an embodiment of a subset of the execution of a fused multiply accumulate.

FIG. 9 illustrates an embodiment of a subset of the execution of a fused multiply accumulate. In particular, this illustrates execution circuitry of an iteration of one packed data element position of the destination. In this embodiment, the fused multiply accumulate is operating on a signed source and an unsigned source wherein the accumulator is 4× the input data size. FIG. 10 illustrates an embodiment of pseudo code for implementing this instruction in hardware.

A first signed source (source 1 901) and a second unsigned source (source 2 903) each have four packed data elements. Each of these packed data elements data such as floating point or integer data. A third signed source (source 3 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 907, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 911.

The result of the addition of the results of the multiplications is added to the data from most significant packed data element position of the signed source 3 915 (using a different adder 913 or the same adder 911).

Finally, the result of the second addition is stored into the signed destination 919 in a packed data element position that corresponds to the packed data element positon used from the signed third source 909. In some embodiments, a writemask is applied to this storage such that if a corresponding writemask (bit) is set, the storage happens, and, if not set, the storage does not happen.

Figure 11:
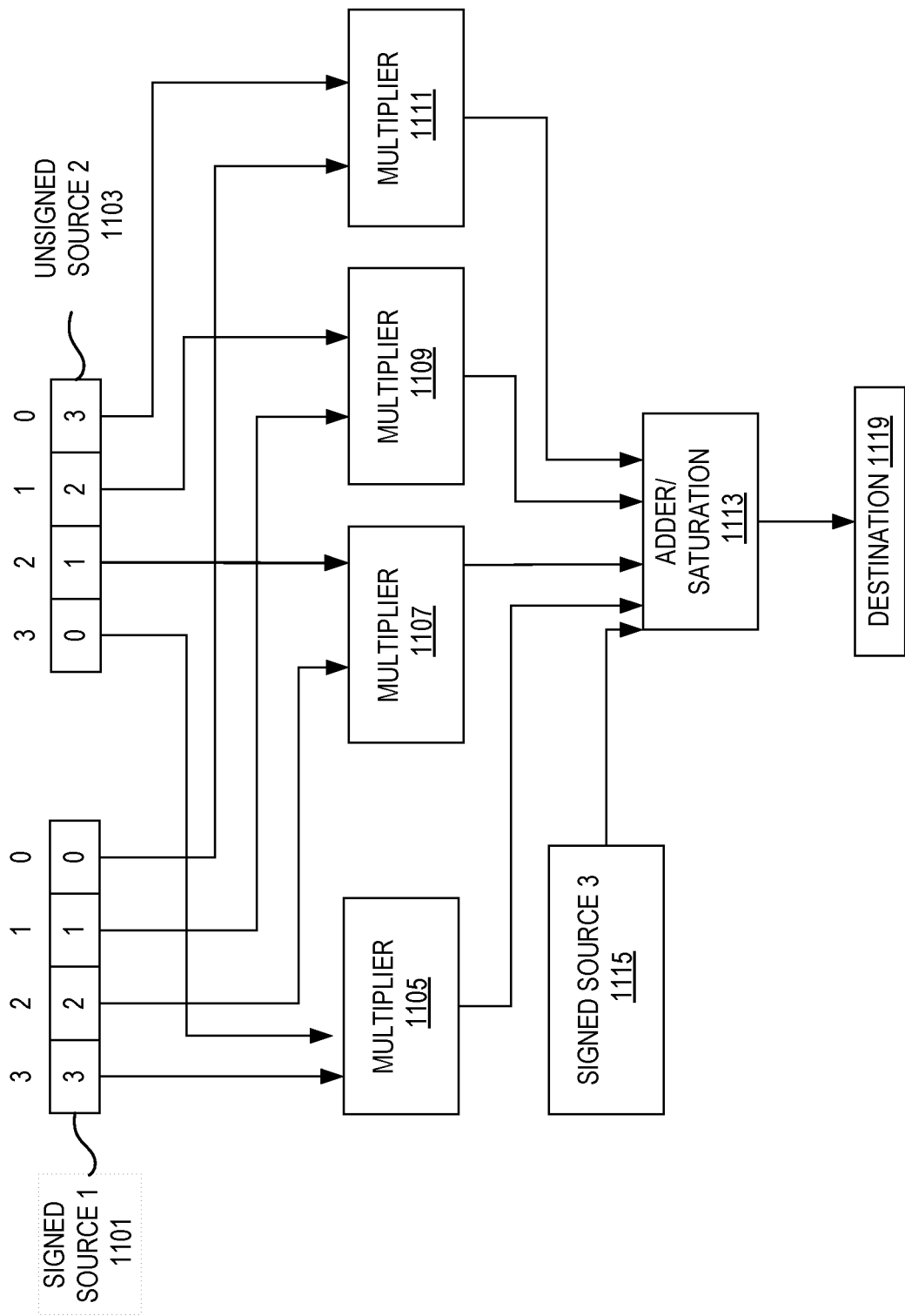
FIG. 11 illustrates an embodiment of a subset of the execution of a fused multiply accumulate.

FIG. 11 illustrates an embodiment of a subset of the execution of a fused multiply accumulate. In particular, this illustrates execution circuitry of an iteration of one packed data element position of the destination. In this embodiment, the fused multiply accumulate is operating on a signed source and an unsigned source wherein the accumulator is 4× the input data size. FIG. 12 illustrates an embodiment of pseudo code for implementing this instruction in hardware.

A first signed source (source 1 1101) and a second unsigned source (source 2 1103) each have four packed data elements. Each of these packed data elements data such as floating point or integer data. A third signed source (source 3 1115) has a packed data element of which stores signed data. The sizes of the first and second sources 1101 and 1103 are a quarter of the third signed source 1115. For example, the first and second sources 1101 and 1103 could have 16-bit packed data elements (e.g., word) and the third signed source 1115 could have 64-bit packed data elements (e.g., double precision floating point or 64-bit integer).

In this illustration, the four most significant packed data element positions of the first and second sources 1101 and 1103 and the most significant packed data element position of the third signed source 1115 are shown. Of course, other packed data element positions would also be processed if there are any.

As illustrated, packed data elements are processed in quadruplets. For example, the data of the most significant packed data element positions of the first and second sources 1101 and 1103 are multiplied using a multiplier circuit 1107, data from second most significant packed data element positions of the first and second sources 1101 and 1103 are multiplied using a multiplier circuit 1107, data from third most significant packed data element positions of the first and second sources 1101 and 1103 are multiplied using a multiplier circuit 1109, and data from the least significant packed data element positions of the first and second sources 1101 and 1103 are multiplied using a multiplier circuit 1111. In some embodiments, the signed packed data elements of the first source 1101 are sign extended and the unsigned packed data elements of the second source 1103 are zero extended prior to the multiplications.

In some embodiments, these multiplier circuits 1105-1111 are reused for other packed data elements positions. In other embodiments, additional multiplier circuits are used so that the packed data elements are processed in parallel. In some contexts, parallel execution is done using lanes that are the size of the signed third source 1115. The result of the addition of the results of the multiplications is added to the data from most significant packed data element position of the signed source 3 1115 are added to the signed third source 1115 using addition/saturation circuitry 1113.

Addition/saturation (accumulator) circuitry 1113 preserves a sign of an operand when the addition results in a value that is too big. In particular, saturation evaluation occurs on the infinite precision result between the multi-way-add and the write to the destination 1115. When the accumulator 1113 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

The result of the addition and saturation check is stored into the signed destination 1119 in a packed data element position that corresponds to the packed data element positon used from the signed third source 715. In some embodiments, a writemask is applied to this storage such that if a corresponding writemask (bit) is set, the storage happens, and, if not set, the storage does not happen.

The figures below detail exemplary architectures and systems to implement embodiments of the above. In some embodiments, one or more hardware components and/or instructions described above are emulated as detailed below, or implemented as software modules.

Exemplary embodiments include a processor comprising a decoder to decode a single instruction having an opcode, a destination field representing a destination operand, and fields for a first, second, and third packed data source operand, wherein packed data elements of the first and second packed data source operand are of a first, different size than a second size of packed data elements of the third packed data operand; a register file having a plurality of packed data registers including registers for the source and destination operands; and execution circuitry to execute the decoded single instruction to perform, for each packed data element position of the destination operand, a multiplication of a M N-sized packed data elements from the first and second packed data sources that correspond to a packed data element position of the third packed data source, add of results from these multiplications to a full-sized packed data element of a packed data element position of the third packed data source, and storage of the addition result in a packed data element position destination corresponding to the packed data element position of the third packed data source, wherein M is equal to the full-sized packed data element divided by N.

In some embodiments, one or more of the following apply: the instruction defines sizes of the packed data elements; the execution circuitry zero extends packed data elements of the second source and sign extends packed data elements of the first source prior to the multiplications; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; and/or when the first size is a quarter of the second size, a single addition and saturation check is performed on each of the multiplications a result from a previous iteration.

Exemplary embodiments include a method of decoding a single instruction having an opcode, a destination field representing a destination operand, and fields for a first, second, and third packed data source operand, wherein packed data elements of the first and second packed data source operand are of a first, different size than a second size of packed data elements of the third packed data operand; a register file having a plurality of packed data registers including registers for the source and destination operands; and executing the decoded single instruction to perform, for each packed data element position of the destination operand, a multiplication of a M N-sized packed data elements from the first and second packed data sources that correspond to a packed data element position of the third packed data source, add of results from these multiplications to a full-sized packed data element of a packed data element position of the third packed data source, and storage of the addition result in a packed data element position destination corresponding to the packed data element position of the third packed data source, wherein M is equal to the full-sized packed data element divided by N.

In some embodiments, one or more of the following apply: the instruction defines sizes of the packed data elements; the execution circuitry zero extends packed data elements of the second source and sign extends packed data elements of the first source prior to the multiplications; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; and/or when the first size is a quarter of the second size, a single addition and saturation check is performed on each of the multiplications a result from a previous iteration.

Exemplary embodiments include a non-transitory machine-readable medium storing an instruction, which when executed to cause method of decoding a single instruction having an opcode, a destination field representing a destination operand, and fields for a first, second, and third packed data source operand, wherein packed data elements of the first and second packed data source operand are of a first, different size than a second size of packed data elements of the third packed data operand; a register file having a plurality of packed data registers including registers for the source and destination operands; and executing the decoded single instruction to perform, for each packed data element position of the destination operand, a multiplication of a M N-sized packed data elements from the first and second packed data sources that correspond to a packed data element position of the third packed data source, add of results from these multiplications to a full-sized packed data element of a packed data element position of the third packed data source, and storage of the addition result in a packed data element position destination corresponding to the packed data element position of the third packed data source, wherein M is equal to the full-sized packed data element divided by N.

In some embodiments, one or more of the following apply: the instruction defines sizes of the packed data elements; the execution circuitry zero extends packed data elements of the second source and sign extends packed data elements of the first source prior to the multiplications; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; and/or when the first size is a quarter of the second size, a single addition and saturation check is performed on each of the multiplications a result from a previous iteration.

Exemplary embodiments include a system including memory and a processor comprising a decoder to decode a single instruction having an opcode, a destination field representing a destination operand, and fields for a first, second, and third packed data source operand, wherein packed data elements of the first and second packed data source operand are of a first, different size than a second size of packed data elements of the third packed data operand; a register file having a plurality of packed data registers including registers for the source and destination operands; and execution circuitry to execute the decoded single instruction to perform, for each packed data element position of the destination operand, a multiplication of a M N-sized packed data elements from the first and second packed data sources that correspond to a packed data element position of the third packed data source, add of results from these multiplications to a full-sized packed data element of a packed data element position of the third packed data source, and storage of the addition result in a packed data element position destination corresponding to the packed data element position of the third packed data source, wherein M is equal to the full-sized packed data element divided by N.

In some embodiments, one or more of the following apply: the instruction defines sizes of the packed data elements; the execution circuitry zero extends packed data elements of the second source and sign extends packed data elements of the first source prior to the multiplications; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; and/or when the first size is a quarter of the second size, a single addition and saturation check is performed on each of the multiplications a result from a previous iteration.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13B:
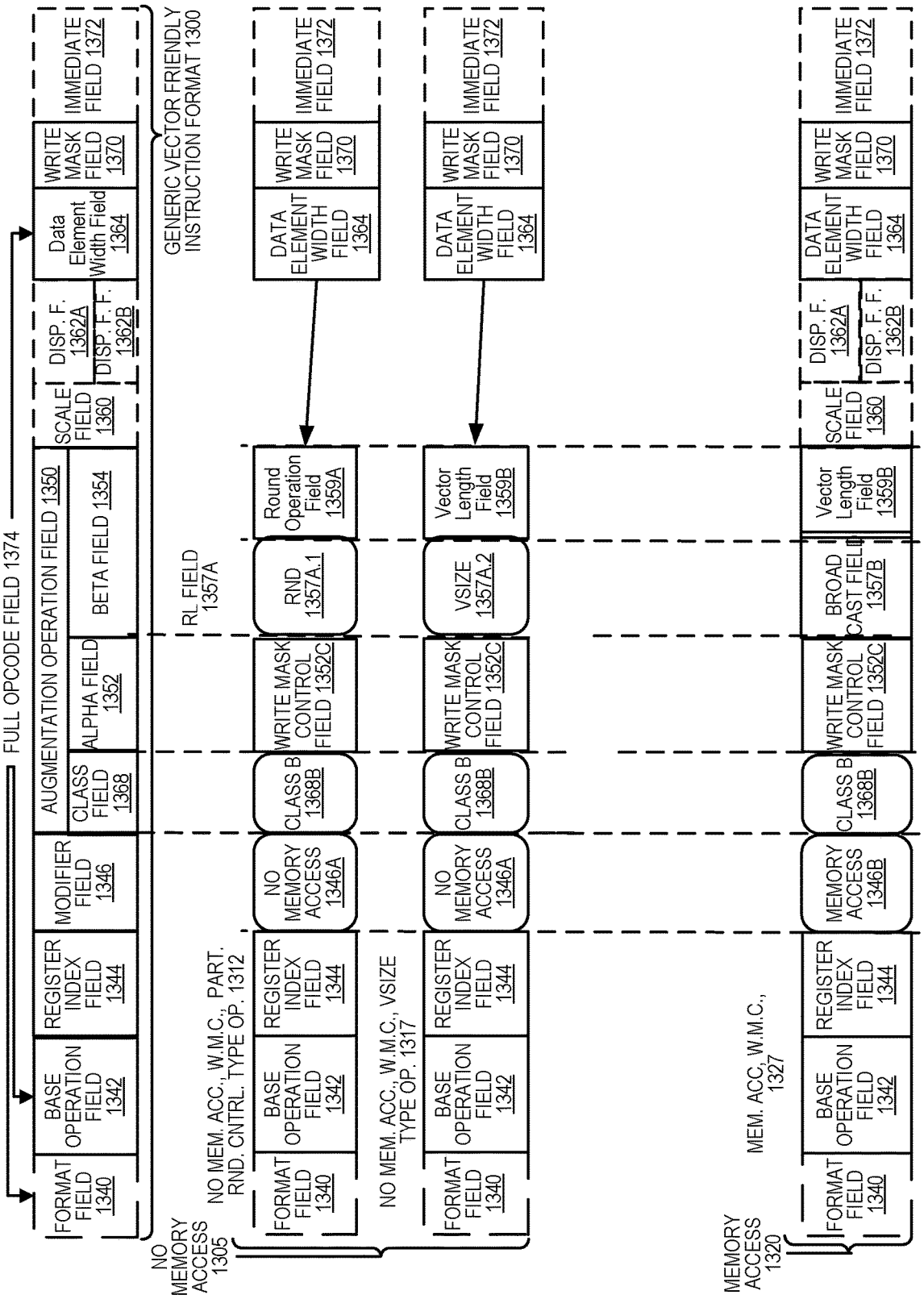
FIG. 13B is a block diagram illustrating the generic vector friendly instruction format and class B instruction templates thereof according to embodiments of the invention.

FIGS. 13A-13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}$*index+base).

Displacement Field 1362A—its content is used as part of memory address generation (e.g., for address generation that uses $2^{scale}$*index+base+displacement).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).
Instruction Templates of Class A In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 13628 are not present.
No-Memory Access Instruction Templates—Full Round Control Type Operation In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 13548, whose content distinguishes which one of a number of data transforms is to be performed (e.g., no data transform, swizzle, broadcast).

In the case of a memory access 1320 instruction template of class A, the alpha field 1352 is interpreted as an eviction hint field 13528, whose content distinguishes which one of the eviction hints is to be used (in FIG. 13A, temporal 13526.1 and non-temporal 13526.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 13626.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14A is a block diagram illustrating an exemplary specific vector friendly instruction format according to embodiments of the invention. FIG. 14A shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14A map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]-R), EVEX.X bit field (EVEX byte 1, bit [6]-X), and 1357BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)—its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.U=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
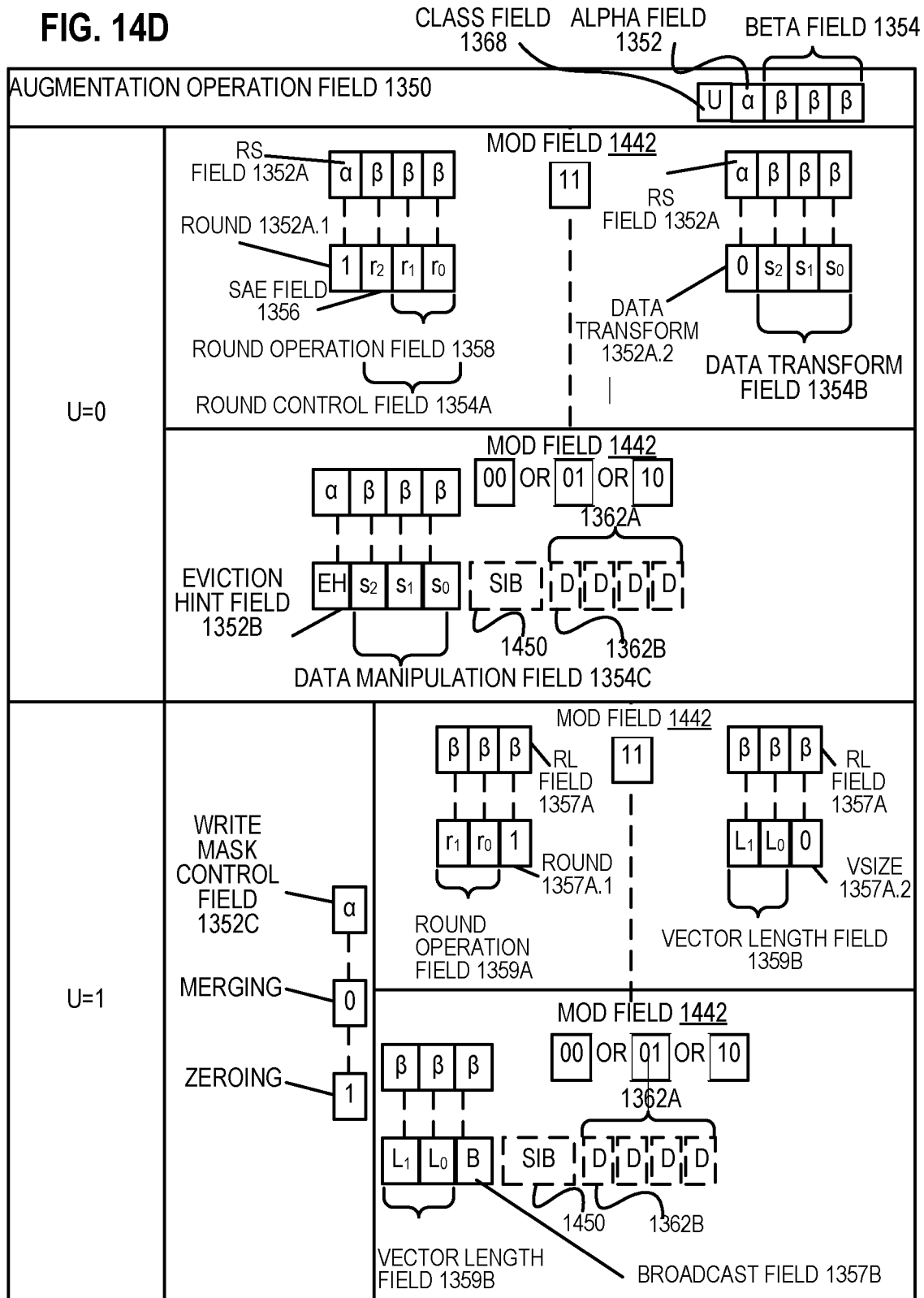
FIG. 14D is a block diagram illustrating the fields of the specific vector friendly instruction format that make up the augmentation operation field according to one embodiment of the invention.

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-$S_0$) is interpreted as the RL field 1357A; when it contains a 1 (round 1357A.1) the rest of the beta field 1354 (EVEX byte 3, bit [6-5]-$S_{2-1}$) is interpreted as the round operation field 1359A, while when the RL field 1357A contains a 0 (VSIZE 1357.A2) the rest of the beta field 1354 (EVEX byte 3, bit [6-5]-$S_{2-1}$) is interpreted as the vector length field 1359B (EVEX byte 3, bit [6-5]-$L_{1-0}$). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-$L_{1-0}$) and the broadcast field 1357B (EVEX byte 3, bit B).

Exemplary Register Architecture

Figure 15:
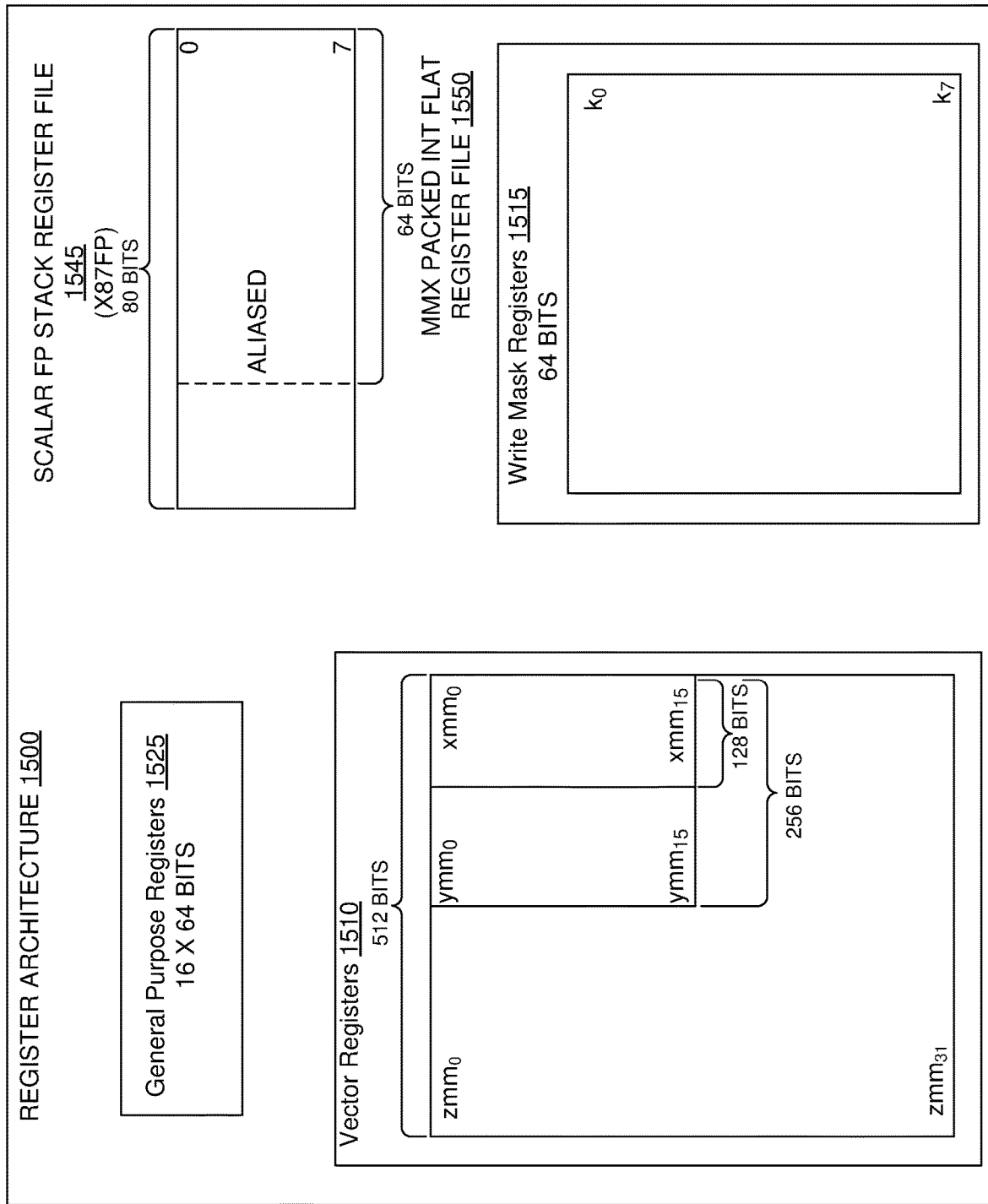
FIG. 15 is a block diagram of a register architecture according to one embodiment of the invention.

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16.

The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
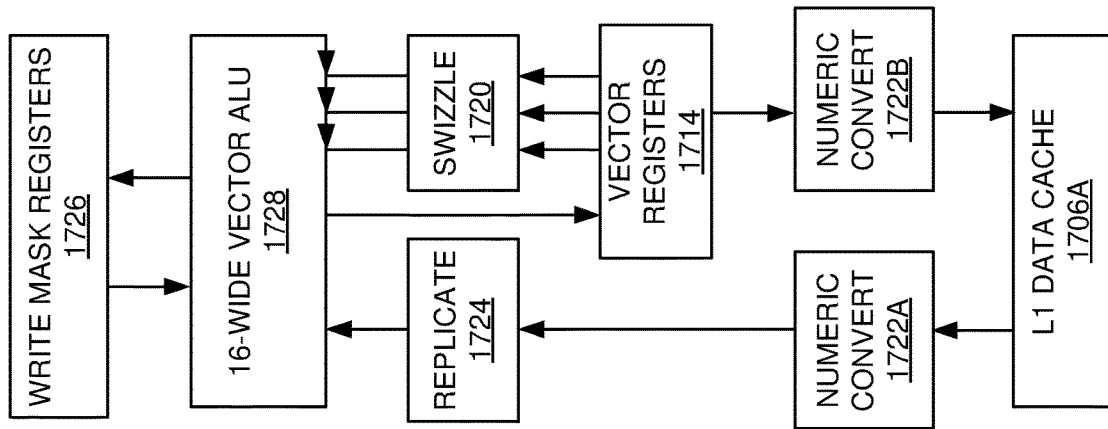
FIG. 17B is an expanded view of part of the processor core in FIG. 17A according to embodiments of the invention.
Figure 17A:
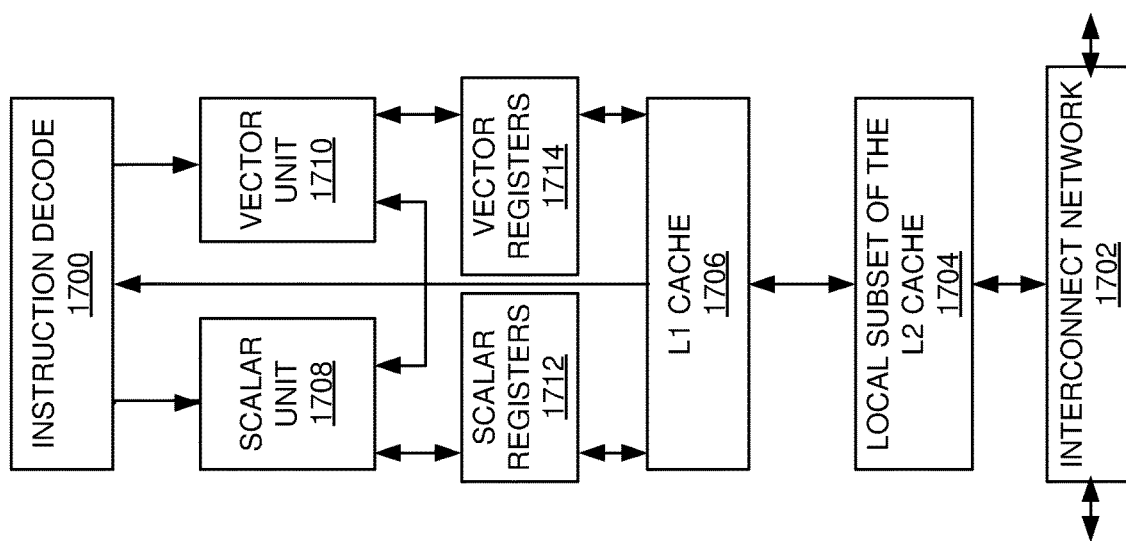
FIG. 17A is a block diagram of a single processor core, along with its connection to the on-die interconnect network 1702 and with its local subset of the Level 2 (L2) cache 1704, according to embodiments of the invention.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
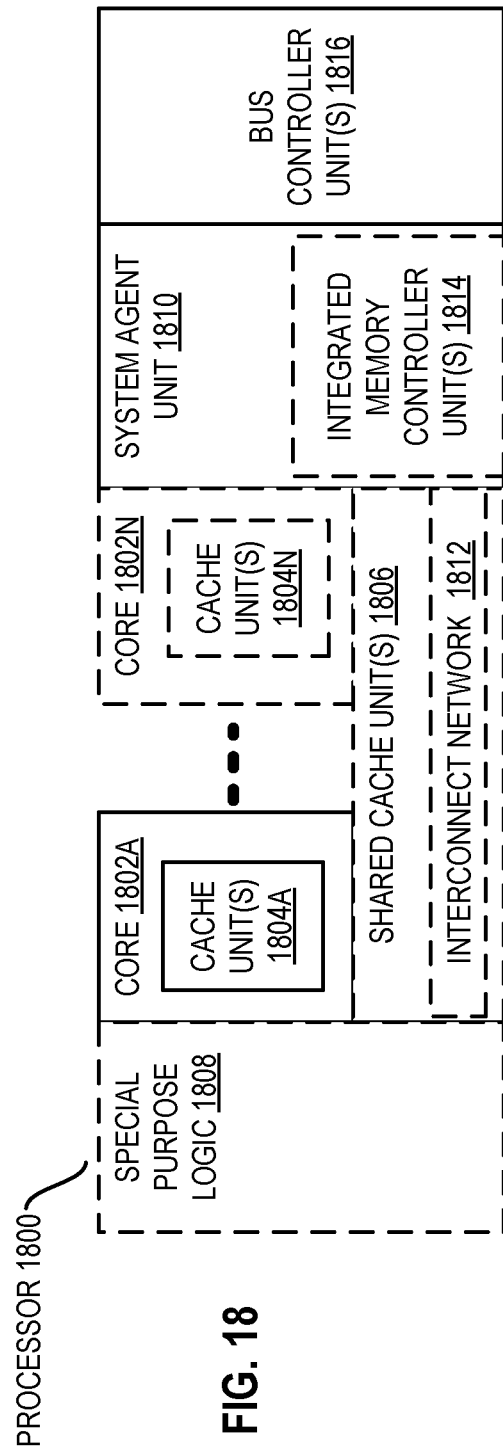
FIG. 18 is a block diagram of a processor 1800 that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808 (integrated graphics logic 1808 is an example of and is also referred to herein as special purpose logic), the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
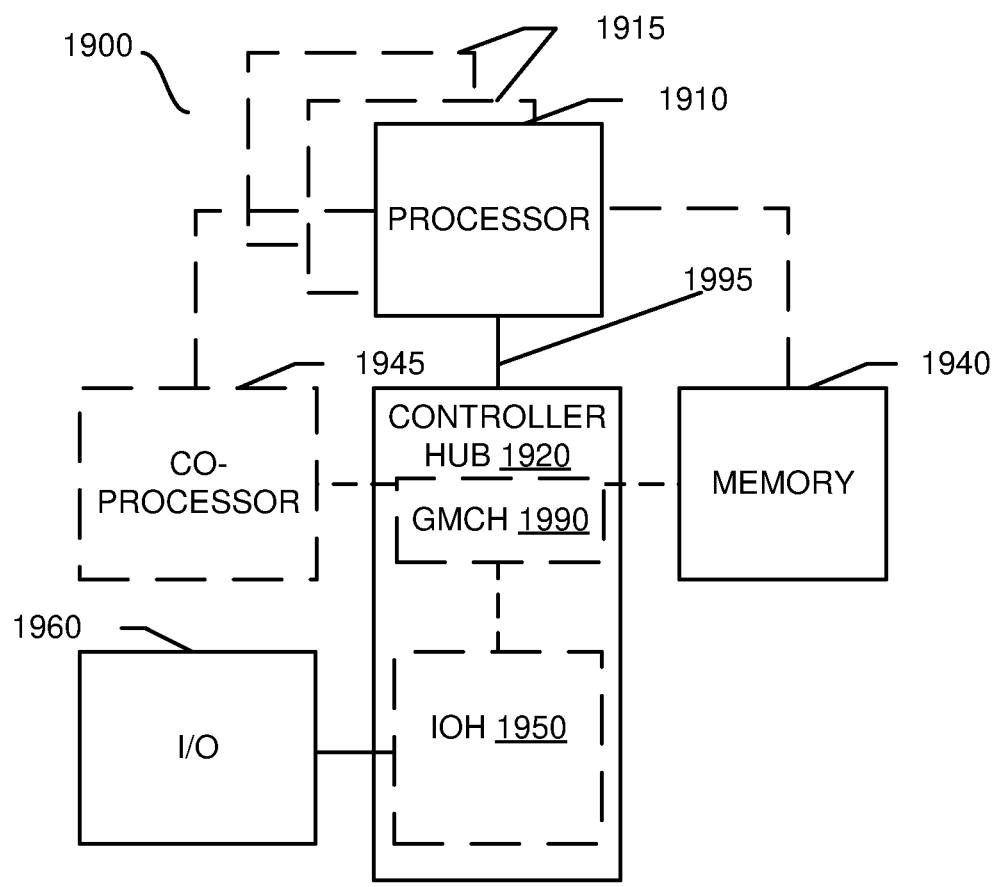
FIG. 19 shown a block diagram of a system in accordance with one embodiment of the present invention.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
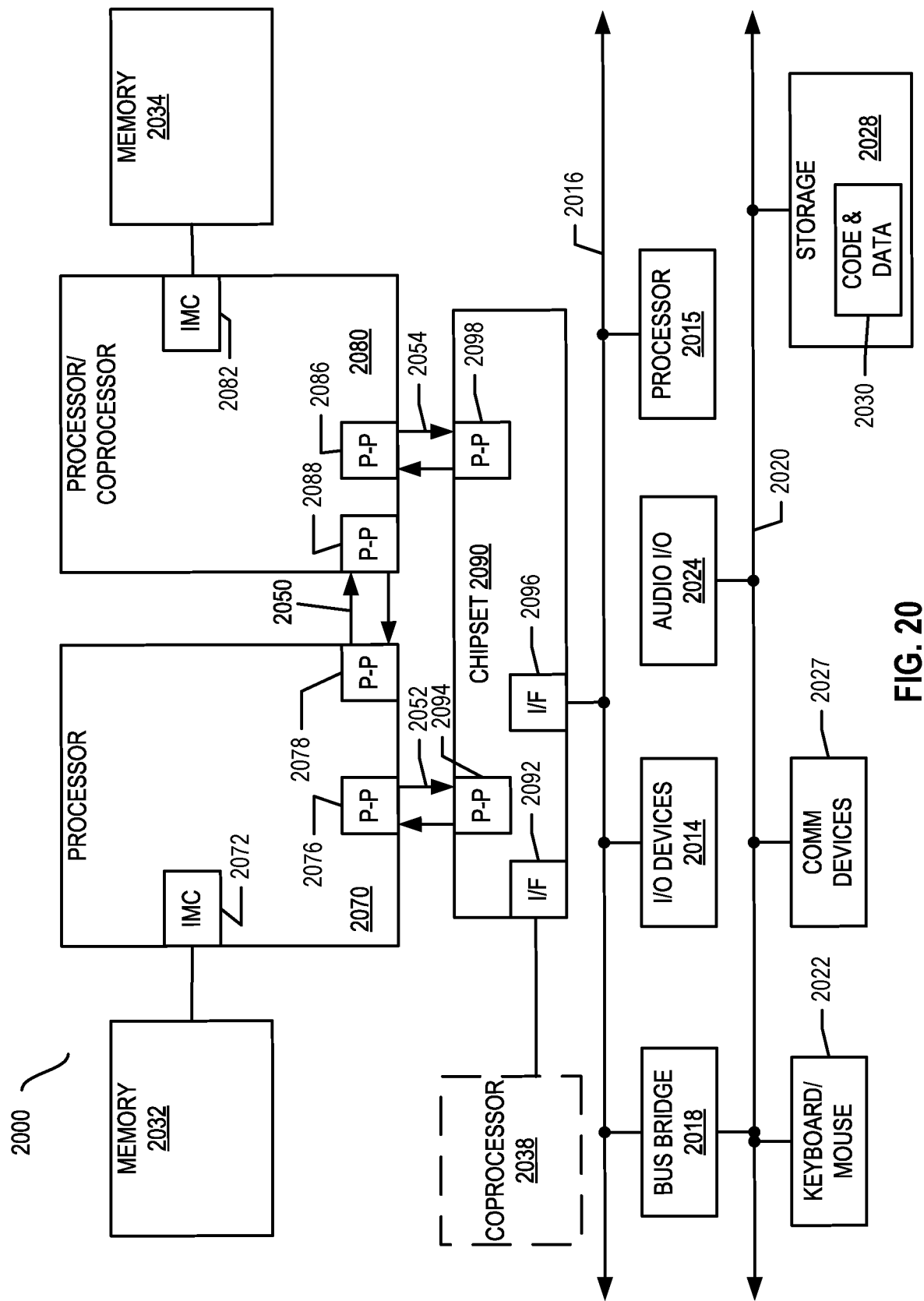
FIG. 20 is a block diagram of a first more specific exemplary system in accordance with an embodiment of the present invention.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2092. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
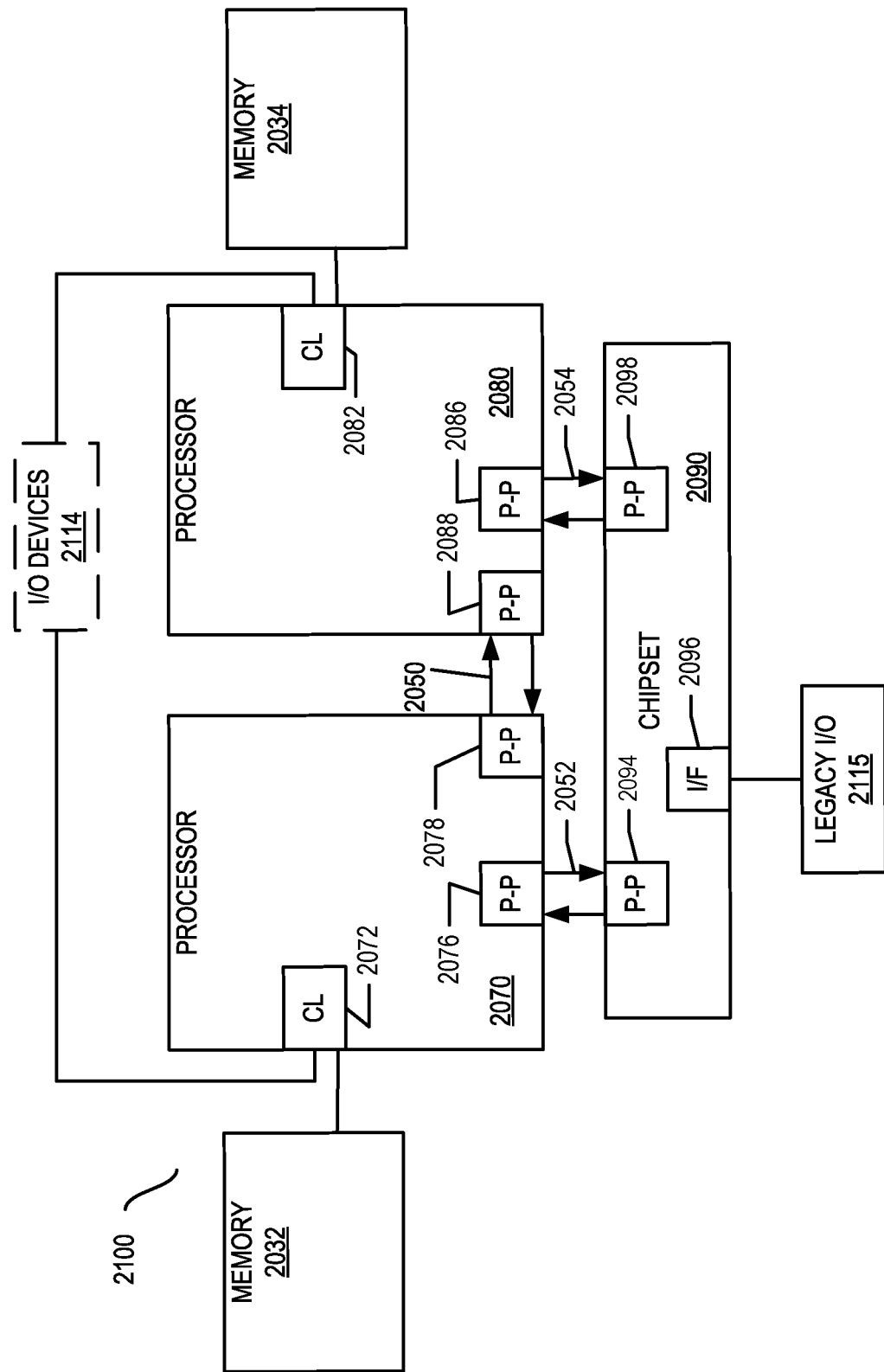
FIG. 21 is a block diagram of a second more specific exemplary system in accordance with an embodiment of the present invention.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
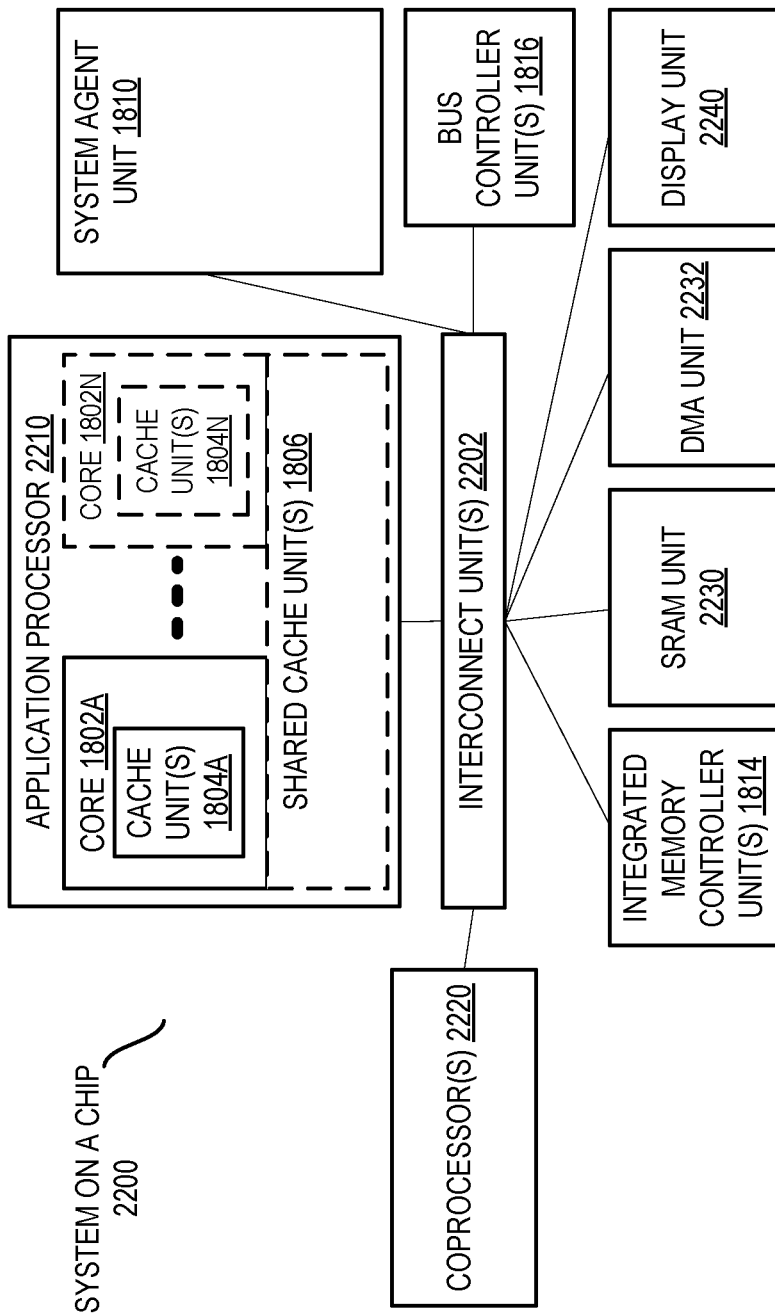
FIG. 22 is a block diagram of a SoC in accordance with an embodiment of the present invention.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 1802A-N, which include cache units 1804A-N, and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

What is claimed is:

1. An apparatus comprising:
    decoder circuitry configured to decode a single instruction having an opcode, a first field to represent a packed data source/destination operand, a second field to represent a first packed data source operand, and a third field to represent a second packed data source operand, wherein packed data elements of the first and second packed data source operands are of a first size and packed data elements of the packed data source/destination operand are of a second size;

a register file having a plurality of packed data registers to store one or more of the packed data source/destination operand, the first packed data source operand, and the second packed data source operand; and execution circuitry coupled to the decoder circuitry and the register file, wherein in response to the decoded single instruction, the execution circuitry, according to the opcode of the single instruction, for each packed data element position of the packed data source/destination operand, is configured to:

sign extend a plurality of packed signed data words from a corresponding packed data element position of the first packed data source operand;

sign extend a plurality of packed signed data words from a corresponding packed data element position of the second packed data source operand;

multiply each of the plurality of sign extended packed signed data words from a corresponding packed data element position of the first packed data source operand with a corresponding one of the plurality of sign extended packed signed data words from a corresponding packed data element position of the second packed data source operand to result in a plurality of results;

add the plurality of results with a packed data element of the second size of a corresponding packed data element position of the packed data source/destination operand to result in an addition result, and saturate the addition result to result in a saturated addition result if a width of the addition result exceeds a width of the second size; and store the addition result or the saturated addition result in the corresponding packed data element position of the packed data source/destination operand.

2. The apparatus of claim 1, wherein the execution circuitry is configured to suppress a memory fault.

3. The apparatus of claim 1, wherein when the single instruction further includes another field for a write mask, the execution circuitry is configured to perform a merging operation.

4. The apparatus of claim 1, wherein the execution circuitry, when a width of the packed data source/destination operand is 128 bits, is configured to perform 4 iterations of the multiply, the add, and the store.

5. The apparatus of claim 1, wherein the execution circuitry, when a width of the packed data source/destination operand is 256 bits, is configured to perform 8 iterations of the multiply, the add, and the store.

6. A method comprising:

decoding, in a decoder of a processor, a single instruction having an opcode, a first field to represent a packed data source/destination operand, a second field to represent a first packed data source operand, and a third field to represent a second packed data source operand, wherein packed data elements of the first and second packed data source operands are of a first size and packed data elements of the packed data source/destination operand are of a second size; and executing, in execution circuitry of the processor coupled to the decoder, according to the opcode of the single instruction to, for each packed data element position of the packed data source/destination operand:

sign extend a plurality of packed signed data words from a corresponding packed data element position of the first packed data source operand;

sign extend a plurality of packed signed data words from a corresponding packed data element position of the second packed data source operand;

multiply each of the plurality of sign extended packed signed data words from a corresponding packed data element position of the first packed data source operand with a corresponding one of the plurality of sign extended packed signed data words from a corresponding packed data element position of the second packed data source operand to result in a plurality of results;

add the plurality of results with a packed data element of the second size of a corresponding packed data element position of the packed data source/destination operand to result in an addition result, and saturate the addition result to result in a saturated addition result if a width of the addition result exceeds a width of the second size; and store the addition result or the saturate addition result in the corresponding packed data element position of the packed data source/destination operand.

7. The method of claim 6, wherein the executing further comprises suppressing a memory fault.

8. The method of claim 6, wherein the executing further comprises performing a merging operation when the single instruction further includes another field for a write mask.

9. The method of claim 6, wherein the executing further comprises, when a width of the packed data source/destination operand is 128 bits, performing 4 iterations of the multiply, the add, and the store.

10. The method of claim 6, wherein the executing further comprises, when a width of the packed data source/destination operand is 256 bits, performing 8 iterations of the multiply, the add, and the store.

11. A non-transitory machine-readable medium comprising an instruction, which when executed by a processor, causes the processor to:

decode, in a decoder of the processor, the instruction having an opcode, a first field to represent a packed data source/destination operand, a second field to represent a first packed data source operand, and a third field to represent a second packed data source operand, wherein packed data elements of the first and second packed data source operands are of a first size and packed data elements of the packed data source/destination operand are of a second size; and execute, in execution circuitry of the processor coupled to the decoder, according to the opcode of the instruction to, for each packed data element position of the packed data source/destination operand:

sign extend a plurality of packed signed data words from a corresponding packed data element position of the first packed data source operand;

sign extend a plurality of packed signed data words from a corresponding packed data element position of the second packed data source operand;

multiply each of the plurality of sign extended packed signed data words from a corresponding packed data element position of the first packed data source operand with a corresponding one of the plurality of sign extended packed signed data words from a corresponding packed data element position of the second packed data source operand to result in a plurality of results;

add the plurality of results with a packed data element of the second size of a corresponding packed data element position of the packed data source/destination operand to result in an addition result, and saturate the addition result to result in a saturated addition result if a width of the addition result exceeds a width of the second size; and store the addition result or the saturated addition result in the corresponding packed data element position of the packed data source/destination operand.

12. The non-transitory machine-readable medium of claim 11, wherein the instruction, when executed by the processor, causes the processor to suppress a memory fault.

13. The non-transitory machine-readable medium of claim 11, wherein the instruction, when executed by the processor, causes the processor to perform a merging operation when the instruction further includes another field for a write mask.

14. The non-transitory machine-readable medium of claim 11, wherein the instruction, when executed by the processor, causes the processor to, when a width of the packed data source/destination operand is 128 bits, perform 4 iterations of the multiply, the add, and the store.

15. The non-transitory machine-readable medium of claim 11, wherein the instruction, when executed by the processor, causes the processor to, when a width of the packed data source/destination operand is 256 bits, perform 8 iterations of the multiply, the add, and the store.

16. A system comprising:
a processor comprising:
a decoder to decode a single instruction having an opcode, a first field to represent a packed data source/destination operand, a second field to represent a first packed data source operand, and a third field to represent a second packed data source operand, wherein packed data elements of the first and second packed data source operands are of a first size and packed data elements of the packed data source/destination operand are of a second size;
a register file having a plurality of packed data registers to store one or more of the packed data source/destination operand, the first packed data source operand, and the second packed data source operand; and
execution circuitry coupled to the decoder and the register file, wherein in response to the decoded single instruction, the execution circuitry, according to the opcode of the single instruction, for each packed data element position of the packed data source/destination operand, is to:
sign extend a plurality of packed signed data words from a corresponding packed data element position of the first packed data source operand;
sign extend a plurality of packed signed data words from a corresponding packed data element position of the second packed data source operand;
multiply each of the plurality of sign extended packed signed data words from a corresponding packed data element position of the first packed data source operand with a corresponding one of the plurality of sign extended packed signed data words from a corresponding packed data element position of the second packed data source operand to result in a plurality of results;
add the plurality of results with a packed data element of the second size of a corresponding packed data element position of the packed data source/destination operand to result in an addition result, and saturate the addition result to result in a saturated addition result if a width of the addition result exceeds a width of the second size; and
store the addition result or the saturated addition result in the corresponding packed data element position of the packed data source/destination operand; and
a dynamic random access memory coupled to the processor.

17. The system of claim 16, wherein the execution circuitry is to suppress a memory fault.

18. The system of claim 16, wherein when the single instruction further includes another field for a write mask, the execution circuitry is to perform a merging operation.

19. The system of claim 16, wherein the execution circuitry, when a width of the packed data source/destination operand is 128 bits, is to perform 4 iterations of the multiply, the add, and the store.

20. The system of claim 16, wherein the execution circuitry, when a width of the packed data source/destination operand is 256 bits, is to perform 8 iterations of the multiply, the add, and the store.

* * * * *